(12) United States Patent
Hiraku et al.

(10) Patent No.: US 10,184,225 B2
(45) Date of Patent: Jan. 22, 2019

(54) WORKING MACHINE

(71) Applicant: Hitachi Construction Machinery Co., Ltd., Bunkyo-ku, Tokyo (JP)

(72) Inventors: Kenji Hiraku, Kasumigaura (JP); Teppei Saitoh, Mito (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 416 days.

(21) Appl. No.: 14/978,702

(22) Filed: Dec. 22, 2015

(65) Prior Publication Data

US 2016/0177539 A1 Jun. 23, 2016

(30) Foreign Application Priority Data

Dec. 23, 2014 (JP) .................................. 2014-259584

(51) Int. Cl.
*E02F 3/42* (2006.01)
*E02F 3/43* (2006.01)
(Continued)

(52) U.S. Cl.
CPC ............ *E02F 3/425* (2013.01); *E02F 9/2239* (2013.01); *E02F 9/2242* (2013.01); (Continued)

(58) Field of Classification Search
CPC ......... E02F 3/425; E02F 3/435; E02F 9/2239; E02F 9/2242; E02F 9/2292; E02F 9/2296; (Continued)

(56) References Cited

U.S. PATENT DOCUMENTS 9,790,966 B2 * 10/2017 Akiyama ................ F15B 15/02
2011/0030364 A1 2/2011 Persson et al.
(Continued)

FOREIGN PATENT DOCUMENTS

CN 103452918 A 12/2013
CN 103827404 A 5/2014
(Continued)

OTHER PUBLICATIONS

Japanese-language Office Action issued in counterpart Japanese Application No. 2014-259584 dated Sep. 19, 2017 (6 pages).
(Continued)

*Primary Examiner* — Logan Kraft
(74) *Attorney, Agent, or Firm* — Crowell & Moring LLP

(57) ABSTRACT

Closed circuit lines (33, 43, 53, 63) for connecting hydraulic cylinders (17, 18, 19) and closed circuit pumps (31, 41, 51, 61) are provided with a charge pressure adjustment apparatus (75) via a charge line (72) to variably adjust the pressure in the charge line (72). An operating device (12) for operating the hydraulic cylinders (17, 18, 19) and the charge pressure adjustment apparatus (75) are connected to a control device (81). In the case of extending the hydraulic cylinders (17, 18, 19), the control device (81) increases a set pressure of the charge pressure adjustment apparatus (75) to be high to increase the pressure in the bottom side of the hydraulic cylinders (17, 18, 19) in accordance with an operating amount of the operating device (12).

2 Claims, 11 Drawing Sheets

(51) Int. Cl.
*E02F 9/22* (2006.01)
*F15B 11/10* (2006.01)

(52) U.S. Cl.
CPC .......... *E02F 9/2292* (2013.01); *E02F 9/2296* (2013.01); *F15B 11/10* (2013.01); *E02F 3/435* (2013.01); *F15B 2211/20576* (2013.01); *F15B 2211/56* (2013.01); *F15B 2211/785* (2013.01); *Y02P 80/13* (2015.11)

(58) Field of Classification Search
CPC ............ F15B 11/10; F15B 2211/20576; F15B 2211/56; F15B 2211/785; Y02P 80/13
See application file for complete search history.

(56) References Cited

U.S. PATENT DOCUMENTS

| | | |
|---|---|---|
| 2012/0240582 A1 | 9/2012 | Ooki et al. |
| 2013/0047598 A1 | 2/2013 | Shimazu et al. |
| 2013/0312399 A1 | 11/2013 | Hiraku et al. |
| 2014/0165543 A1 | 6/2014 | Takebayashi et al. |
| 2014/0227104 A1 | 8/2014 | Takahashi et al. |
| 2014/0283508 A1 | 9/2014 | Hiraku et al. |
| 2014/0345265 A1 | 11/2014 | Akiyama et al. |
| 2014/0366519 A1 | 12/2014 | Sadamori et al. |

FOREIGN PATENT DOCUMENTS

| | | |
|---|---|---|
| CN | 103890409 A | 6/2014 |
| CN | 103890413 A | 6/2014 |
| CN | 104011400 A | 8/2014 |
| CN | 104093995 A | 10/2014 |
| JP | 58-72506 U | 5/1983 |
| JP | 2005-76781 A | 3/2005 |
| JP | 2012-202142 A | 10/2012 |
| JP | 2013-174325 A | 9/2013 |
| JP | 2013-245787 A | 12/2013 |

OTHER PUBLICATIONS

Chinese-language Office Action issued in counterpart Chinese Application No. 201510971740.4 dated Apr. 1, 2017 (7 pages).

* cited by examiner

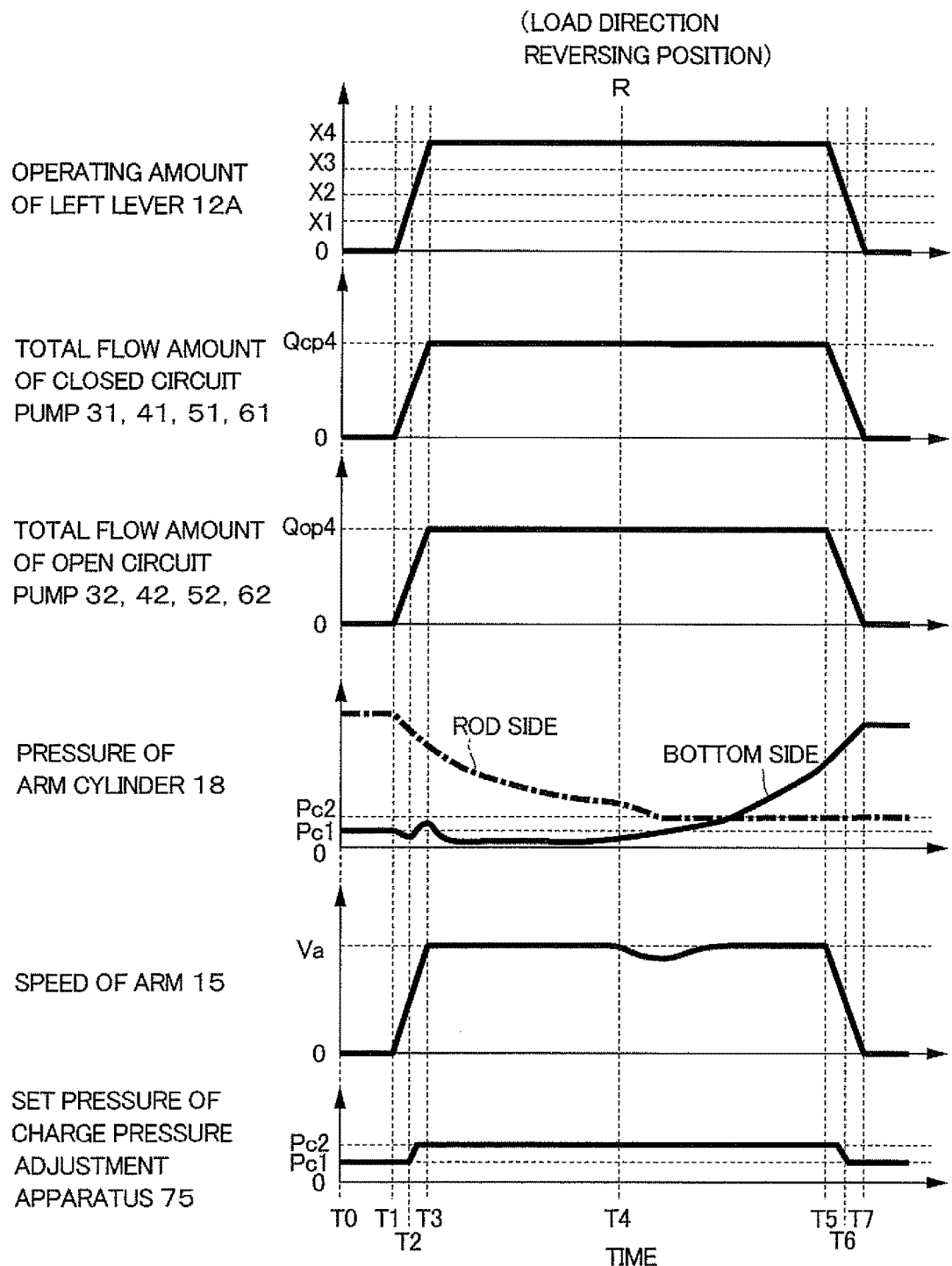

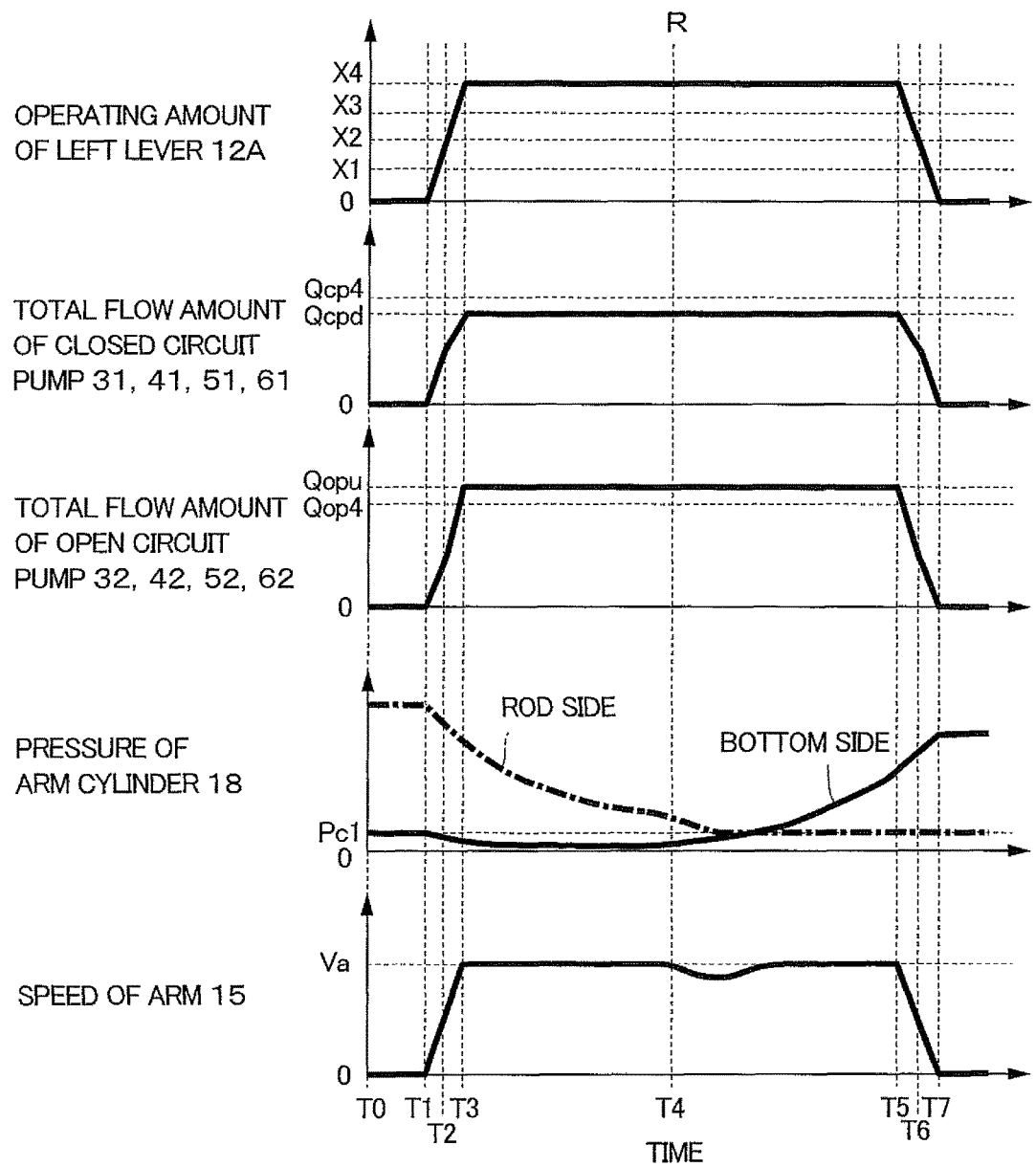

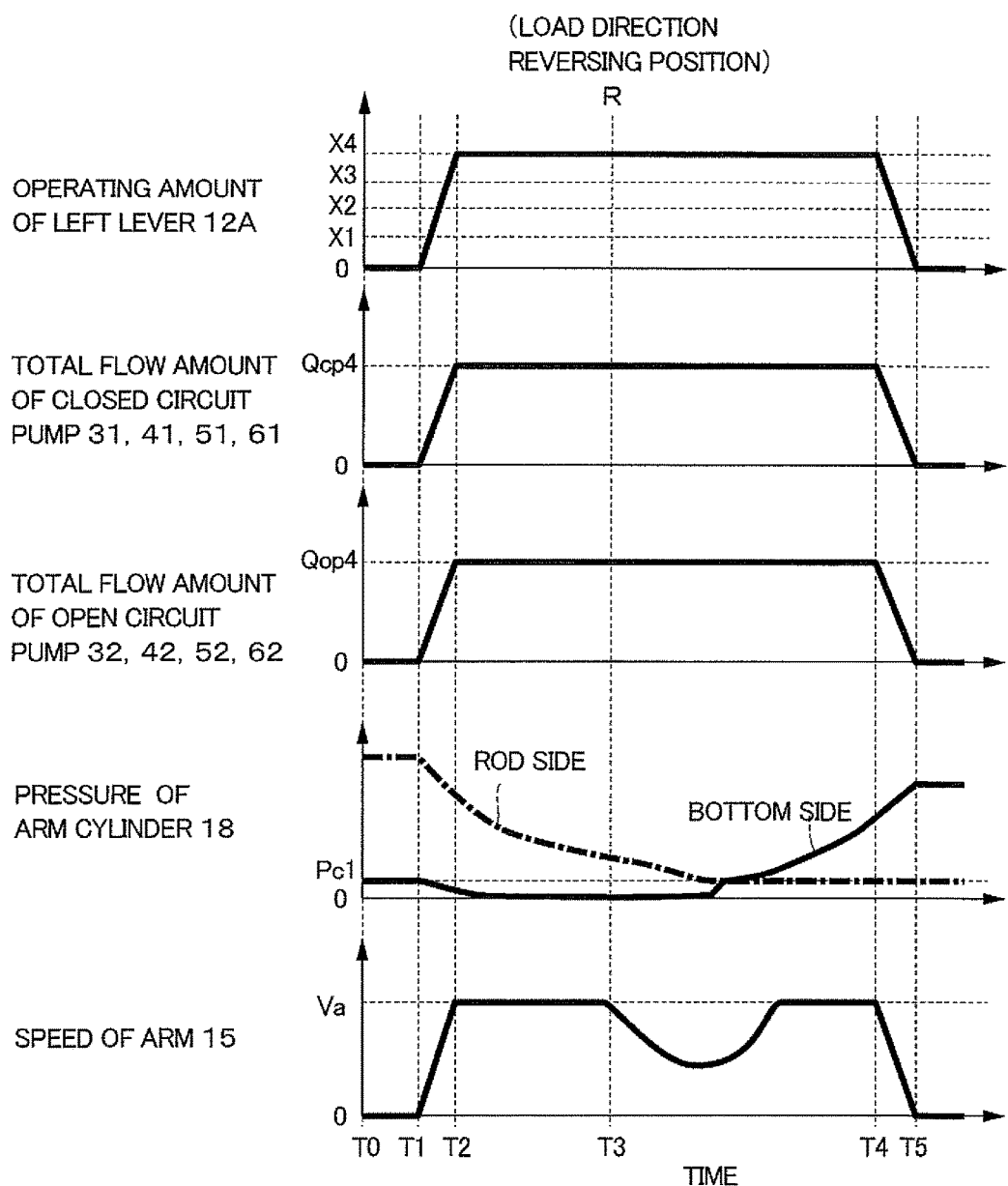

WORKING MACHINE

TECHNICAL FIELD

The present invention relates to a working machine, such as a hydraulic excavator, a wheel loader or the like, and particularly to a working machine that drives a hydraulic cylinder with a hydraulic closed circuit.

BACKGROUND ART

In recent years, there has been a demand for a further improvement on energy saving in a working machine such as a hydraulic excavator, a wheel loader or the like. Here, for the energy saving of the working machine, the energy saving of a hydraulic system itself becomes important. Therefore, there have been made studies on adopting a hydraulic closed circuit system, in which a hydraulic pump and a hydraulic actuator are connected in a closed circuit and the hydraulic actuator is directly controlled by the hydraulic pump, for the working machine (Patent Document 1).

The hydraulic closed circuit system can control pressure losses due to a control valve to be smaller as compared to a hydraulic open circuit system that connects a hydraulic pump and a hydraulic actuator in an open circuit. Along with it, since the hydraulic pump delivers only a required flow amount, it is possible to suppress the flow amount loss also. In addition, it is possible to perform regeneration of potential energy or kinetic energy at deceleration of the actuator. Accordingly, the high-level energy saving is made possible.

Here, Patent Document 1 describes the working machine using the hydraulic closed circuit with a hydraulic drive system in which when a hydraulic cylinder is at a stop, the delivery pressure of a charge pump is made lower than usual, thus making it possible to reduce the loss of consumption power in the charge pump.

PRIOR ART DOCUMENT

Patent Document

Patent Document 1: Japanese Patent Laid-Open No. 2013-174325 A

SUMMARY OF THE INVENTION

Incidentally, since there is a difference between a pressure-receiving area of a bottom side oil chamber and a pressure-receiving area of a rod side oil chamber in a hydraulic cylinder in a case of extending the hydraulic cylinder, it is necessary to supply a larger amount of hydraulic oil to the bottom side oil chamber than the hydraulic oil discharged from the rod side oil chamber. Therefore, the hydraulic drive system according to Patent Document 1 is configured such that, for supplementing the difference between a discharge amount of the hydraulic oil from the rod side oil chamber and a supply amount of the hydraulic oil to the bottom side oil chamber, an open circuit pump is provided in addition to the closed circuit pump. That is, Patent Document 1 is configured with the closed circuit pump (first hydraulic pump) that is connected to the bottom side oil chamber and the rod side oil chamber in the hydraulic cylinder in the closed circuit and further, the open circuit pump (second hydraulic pump) that is connected to the bottom side oil chamber only.

In this case, the open circuit pump and the closed circuit pump are driven such that a ratio of these delivery flow amounts becomes a ratio to be capable of compensating for a difference in pressure-receiving area between the bottom side oil chamber and the rod side oil chamber. More specifically, when the pressure-receiving area of the bottom side oil chamber in the hydraulic cylinder is indicated at "Ah", the pressure-receiving area of the rod side oil chamber in the hydraulic cylinder is indicated at "Ar", and the delivery flow amount of the closed circuit pump is indicated at "1", the delivery flow amount of the open circuit pump is indicated at "Ah/Ar−1". Further, Patent Document 1 is configured to be, for supplementing the leak oil of the hydraulic closed circuit, provided with a charge pump connected to the hydraulic closed circuit, and a relief valve (relief valve of a set pressure fixing type) for regulating the charge pressure by the charge pump.

In this configuration, for example, in case of lowering down an arm of a hydraulic excavator in the air (extending an arm cylinder in the air), that is, at the arm crowding, a cylinder speed (extension speed) of the arm cylinder varies in the middle of transitioning from a posture where the arm is extended to a posture where the arm is inwardly bent, possibly leading to a degradation in operability. Hereinafter, an explanation will be made of this point.

The first half of the arm crowding is in a state of a negative load (minus load) in which the closed circuit pump operates while load-holding the arm that would drop with the self-weight, and the latter half of the arm crowding is in a state of a positive load (plus load) in which the closed circuit pump lifts up the arm against a force of gravity. Here, in the first half of the arm crowding, the pressure (rod pressure) in the rod side oil chamber of the arm cylinder becomes a high pressure with the self-weight, and the pressure (bottom pressure) in the bottom side oil chamber becomes a charge pressure because of no action of loads thereon. At this time, the closed circuit pump suctions high-pressure oil discharged from the rod side oil chamber, and delivers it to the bottom side oil chamber. However, because of an internal leak in the hydraulic pump, the closed circuit pump results in delivering the flow amount smaller than the suctioned flow amount. Therefore, the hydraulic oil is inclined to lack in the bottom side oil chamber, but the hydraulic oil corresponding to the lack amount is supplied via a check valve from the charge pump to the bottom side oil chamber. As a result, the pressure in the bottom side oil chamber is held to the charge pressure.

However, upon increasing the flow amount of the closed circuit pump for operating the arm cylinder at high speeds, the leak flow amount from the closed circuit pump increases correspondingly thereto to increase the flow amount of the hydraulic oil to be supplemented to the closed circuit from a charge line. At this time, because of the resistance of the check valve or the line resistance (an increase in pressure loss), there is a possibility that the pressure in the charge line cannot be held to the charge pressure regulated by the relief valve. As a result, the pressure in the bottom side oil chamber is possibly reduced excessively.

On the other hand, in the latter half of the arm crowding it is necessary to lift up the arm by increasing the pressure in the bottom side oil chamber by the closed circuit pump. At this time, when the arm position transitions to the latter half of the arm crowding in a state where the pressure in the bottom side oil chamber is excessively reduced, it takes time to increase the pressure in the bottom side oil chamber, and there is a possibility that it becomes impossible to apply the drive force to the arm cylinder during this period. As a result, the cylinder speed (extension speed) of the arm cylinder possibly reduces in the middle of the extension.

Here, when the pressure is reduced, a volume elasticity coefficient of hydraulic oil is reduced. For example, in a case of the hydraulic oil having 1% of an air mixing rate, a volume elasticity coefficient at a pressure of 10 MPa is equal to $1.2 \times 10^3$ MPa that is approximately similar to that of a rigid body. In contrast, a volume elasticity coefficient at a pressure of 0.1 MPa is largely reduced to 8 MPa which becomes $1/150$ of $1.2 \times 10^3$ MPa. Therefore, even when the hydraulic oil is sent to the bottom side oil chamber in which the pressure is reduced by the closed circuit pump, the pressure in the bottom side oil chamber is not increased rapidly. As a result, speed variations of the arm are possibly caused at the arm crowding. An operator does not intend that such speed variations occur, that is, the speed of the arm (the extension speed of the arm cylinder) is reduced in the middle of the arm crowding. Therefore, there is a possibility that uncomfortable feelings are given to the operator, thus deteriorating the operability.

The present invention is made in view of the foregoing problem in the conventional art, and an object of the present invention is to provide a working machine that can suppress speed variations of a hydraulic cylinder to achieve excellent operability thereof.

A working machine according to the present invention comprises at least one hydraulic cylinder in which a bottom side oil chamber and a rod side oil chamber are defined by a piston to which one end of a rod is fixed, and that extends or retracts based upon supply/discharge of hydraulic oil; at least one closed circuit pump that is connected to the bottom side oil chamber and the rod side oil chamber in the hydraulic cylinder via a closed circuit line configuring a closed circuit; at least one open circuit pump that is connected to the bottom side oil chamber in the hydraulic cylinder via an open circuit line configuring an open circuit; a charge pump that is connected to the closed circuit line via a charge line and a check valve to supplement the hydraulic oil to the closed circuit line; an operating device for operating the hydraulic cylinder; and a control device that controls the closed circuit pump and the open circuit pump in accordance with an operating amount of the operating device.

For solving the aforementioned problem, the configuration adopted by the present invention is characterized in that the charge line is provided with a charge pressure adjustment apparatus that is controlled by the control device and variably adjusts the pressure in the charge line, wherein in case of extending the hydraulic cylinder, the control device controls at least any one of the closed circuit pump, the open circuit pump and the charge pressure adjustment apparatus in such a manner as to increase the pressure in the bottom side of the hydraulic cylinder in accordance with the operating amount of the operating device.

With this arrangement, in case of extending the hydraulic cylinder, the control device controls at least any one of the closed circuit pump, the open circuit pump and the charge pressure adjustment apparatus in such a manner as to increase the pressure (bottom pressure) in the bottom side of the hydraulic cylinder in accordance with the operating amount of the operating device, that is, a cylinder speed (extension speed) required by the operator. Therefore, also when supply and discharge of a large amount of the hydraulic oil at the high-speed operation of the hydraulic cylinder or the like are necessary (when the pressure loss increases), it is possible to suppress an excessive reduction in the pressure in the bottom side oil chamber of the hydraulic cylinder to suppress a reduction in volume elasticity coefficient of the hydraulic oil. Therefore, it is possible to suppress speed variations of the hydraulic cylinder, that is, a reduction in the extension speed of the hydraulic cylinder in the middle of the extension to obtain the excellent operability.

BRIEF DESCRIPTION OF THE DRAWINGS

FIG. 9 is a characteristic line diagram illustrating an example of a change with time in operating amount of an operating device, in pressure of an arm cylinder, in set pressure of a charge circuit, in arm speed and the like according to a first embodiment.

FIG. 10 is a characteristic line diagram illustrating an example of a change with time in operating amount of an operating device, in flow amounts of hydraulic pumps, in pressure of an arm cylinder, in arm speed and the like according to a second embodiment.

FIG. 11 is a characteristic line diagram illustrating an example of a change with time in operating amount of an operating device, in flow amounts in hydraulic pumps, in pressure of an arm cylinder, in arm speed and the like according to a comparative example.

MODE FOR CARRYING OUT THE INVENTION

Hereinafter, a working machine according to embodiments of the present invention will be in detail explained referring to the accompanying drawings by taking a case where the working machine is applied to a supersize hydraulic excavator, as an example.

FIG. 1 to FIG. 9 illustrate a working machine according to a first embodiment of the present invention.

Figure 1:
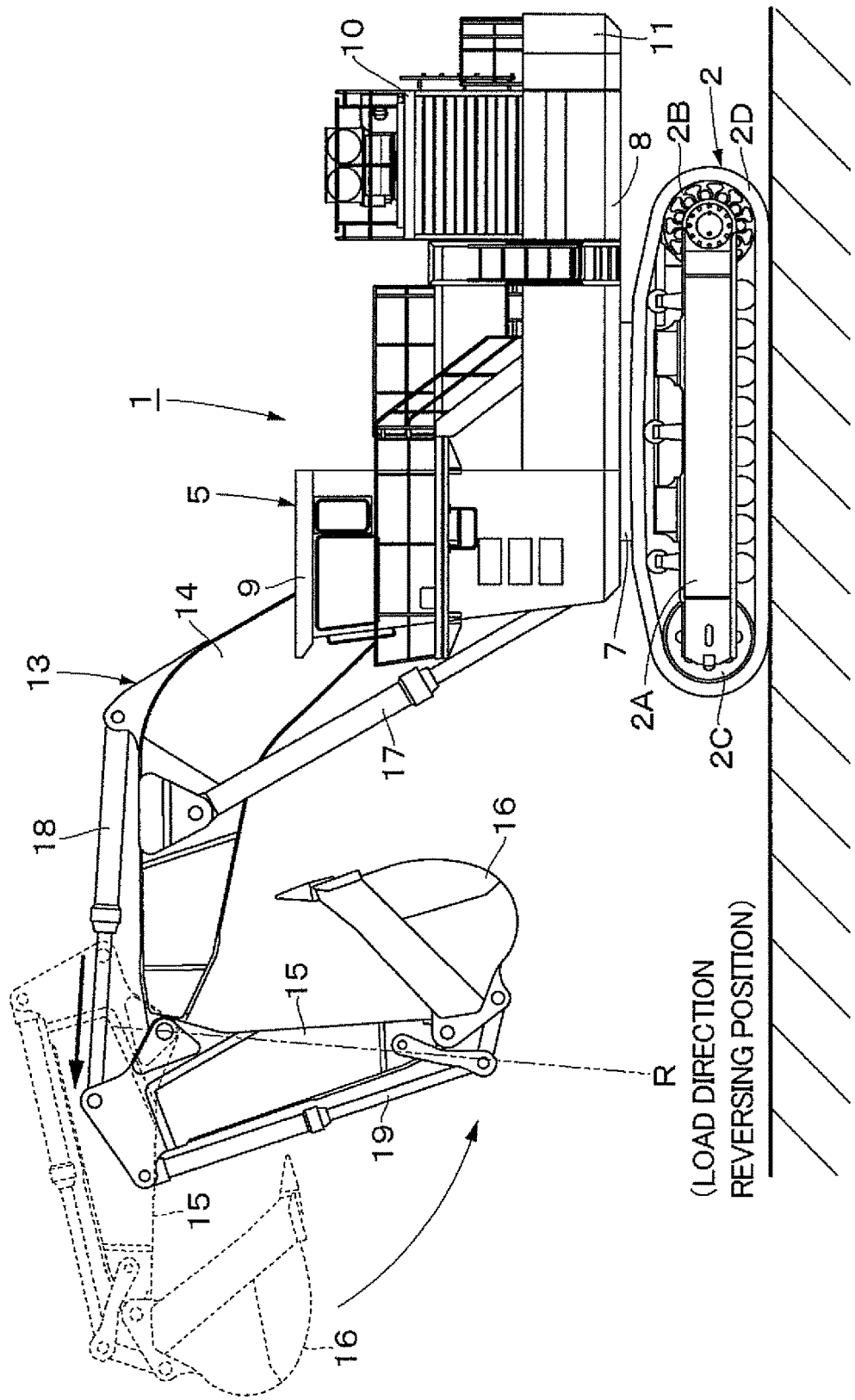
FIG. 1 is a front view illustrating a hydraulic excavator according to an embodiment.
Figure 2:
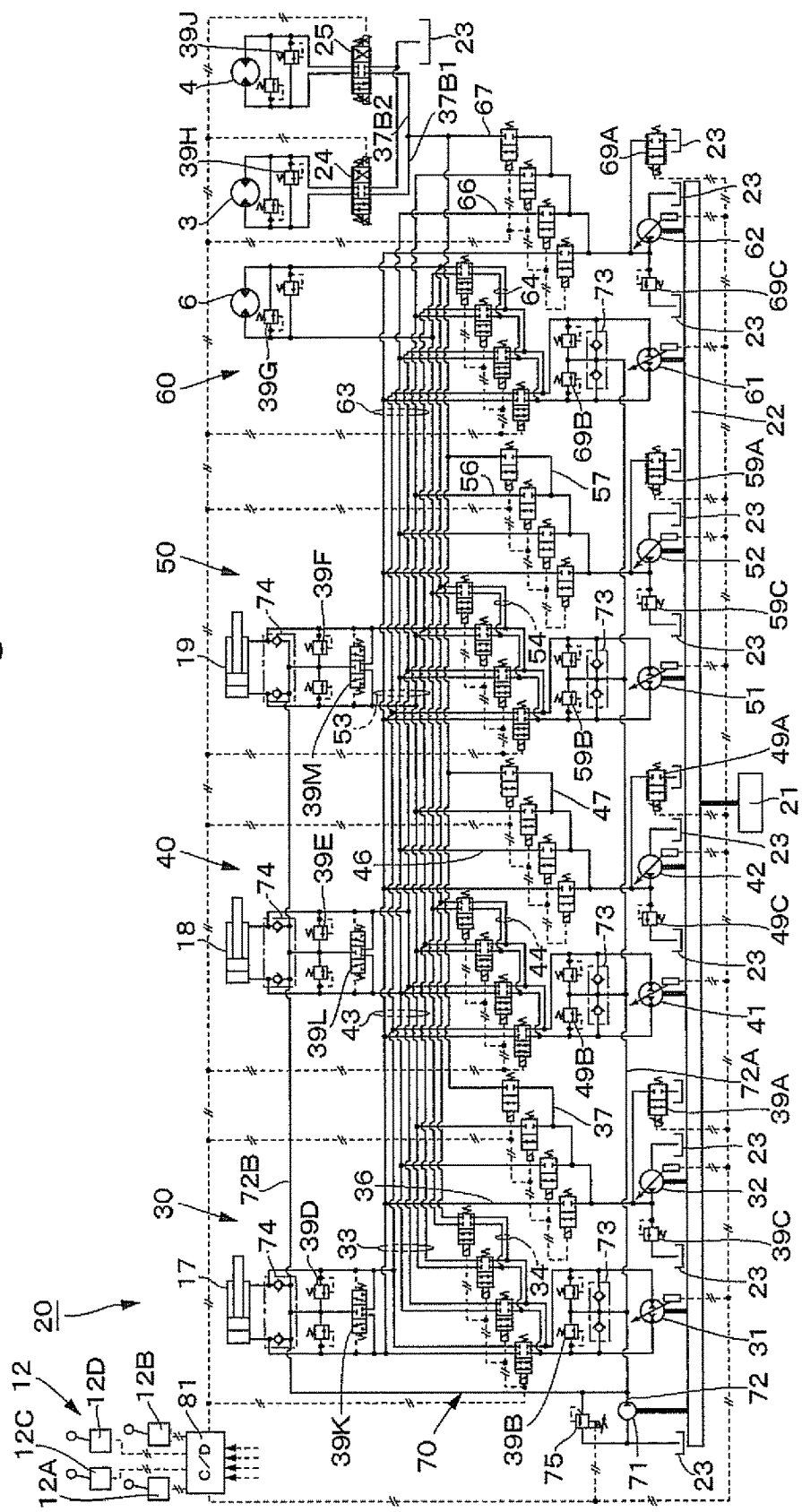
FIG. 2 is a hydraulic circuit diagram illustrating the hydraulic excavator in FIG. 1.

In FIG. 1, a hydraulic excavator 1 as a representative example of a working machine, is used for an excavating work of sand and earth or the like. The hydraulic excavator 1 is configured by a crawler type of automotive lower traveling structure 2, an upper revolving structure 5 that is mounted on the lower traveling structure 2 to be capable of revolving thereon and configures a vehicle body (main body) together with the lower traveling structure 2, and a working mechanism 13, which will be described later, that is provided in a front side of the upper revolving structure 5 in the front-rear direction to be rotatable (capable of lifting and tilting thereto). The hydraulic excavator 1 uses the working mechanism 13 to perform an excavating work of sand and earth or the like.

Here, the lower traveling structure 2 is configured by a truck frame 2A, drive wheels 2B provided in both of the left and right sides of the truck frame 2A, idler wheels 2C provided in both of the left and right sides of the truck frame 2A and at the opposite to the drive wheels 2B in the front-rear direction, and crawler belts 2D wound around the drive wheels 2B and the idler wheels 2C (in either structure, only the left side is illustrated). The left and right drive wheels 2B are rotated by left and right traveling hydraulic motors 3, 4 (refer to FIG. 2 and FIG. 6).

On the other hand, the upper revolving structure 5 is mounted on the lower traveling structure 2 via a revolving apparatus 7 including a revolving hydraulic motor 6 (refer to FIG. 2 and FIG. 6), a reduction gear mechanism, and revolving bearings. The upper revolving structure 5 revolves to the lower traveling structure 2 by the revolving apparatus 7 (revolving hydraulic motor 6). The upper revolving structure 5 serves as a support structure, and is configured by a revolving frame 8 in which the working mechanism 13 is mounted in the front side in the front-rear direction as a base body, a cab 9 that is mounted in the left and front side of the revolving frame 8 to form an operator's room, an engine 21 to be described later that is positioned in the rear side of the cab 9 to be mounted on the revolving frame 8, a housing cover 10 that accommodates therein hydraulic pumps 31, 32, 41, 42, 51, 52, 61, 62, 71 and the like (refer to FIGS. 2 to 7), and a counterweight 11 that is mounted in the rear part of the revolving frame 8 to act as a weight balance to the working mechanism 13.

Here, an operator's seat (not illustrated) on which an operator is seated is provided inside the cab 9, and operating devices 12 (refer to FIGS. 2, 3, 7) are provided in the forward side and in both of the left and right sides of the operator's seat to operate the hydraulic excavator 1. The operating devices 12 are configured by, for example, a working left lever device (hereinafter, called a left lever 12A) for operating the revolving hydraulic motor 6 and an arm cylinder 18 to be described later, a working right lever device (hereinafter, called a right lever 12B) for operating a boom cylinder 17 and a bucket cylinder 19 to be described later, left and right traveling lever devices (hereinafter, called left and right traveling lever-pedals 12C, 12D) for operating the left and right traveling hydraulic motors 3, 4, and the like.

The operating device 12 is connected to a control device 81 to be described later via signal lines. An operation of the operating device 12 by an operator enables a revolving operation of the upper revolving structure 5, a rotating operation (lifting and tilting operation) of the working mechanism 13, and a traveling operation of the lower traveling structure 2. For example, an operation of the left lever 12A by the operator causes extension and retraction of the arm cylinder 18, thus making it possible to rotate an arm 15 to be described later. In addition, an operation of the right lever 12B by the operator causes extension and retraction of the boom cylinder 17, thus making it possible to rotate a boom 14 to be described later.

On the other hand, as illustrated in FIG. 1, the working mechanism 13 includes the boom 14 that is rotatably (liftably and tiltably) mounted in the front part of the revolving frame 8 in a pin connection, the arm 15 that is rotatably (liftably and tiltably) mounted in the front end side of the boom 14 in a pin connection, and the bucket 16 as a working tool that is rotatably mounted in the front end side of the arm 15 in a pin connection. The boom 14, the arm 15 and the bucket 16 are respectively provided with the left and right boom cylinders 17, the arm cylinder 18 and the bucket cylinder 19 as hydraulic cylinders. The boom cylinder 17 rotates the boom 14 to the revolving frame 8. The arm cylinder 18 rotates the arm 15 to the boom 14. The bucket cylinder 19 as a working tool cylinder rotates the bucket 16 to the arm 15.

The boom cylinder 17, the arm cylinder 18 and the bucket cylinder 19 change the posture of the working mechanism 13 with extension and retraction thereof based upon pressurized oil from the hydraulic pumps 31, 32, 41, 42, 51, 52, 61, 62, 71 to be described later. That is, at the excavating work of sand and earth or the like, the hydraulic cylinders (the boom cylinder 17, the arm cylinder 18 and the bucket cylinder 19) are extended or retracted based upon operations of the left and right levers 12A, 12B, for example, to rotate the bucket 16 while rotating the boom 14 and the arm 15. As a result, sand and earth or the like can be excavated by the front end side of the bucket 16.

Here, as illustrated in FIGS. 2 to 5 and 7, the hydraulic cylinders 17, 18, 19 are respectively configured as one-sided rod type hydraulic cylinders, and extend or retract based upon supply/discharge of the hydraulic oil. That is, the hydraulic cylinders 17, 18, 19 respectively include tubes 17A, 18A, 19A, pistons 17B, 18B, 19B that are slidably inserted/fitted in the tubes 17A, 18A, 19A and define bottom side oil chambers 17C, 18C, 19C and rod side oil chambers 17D, 18D, 19D therein, and rods 17E, 18E, 19E base end sides (one-end sides) of which are fixed to the pistons 17B, 18B, 19B and front end sides (other end sides) of which project outside of the tubes 17A, 18A, 19A. It should be noted that the bottom side oil chamber is sometimes called a head side oil chamber, but in the following explanation, will be described as the bottom side oil chamber.

Next, an explanation will be made with reference to FIG. 2 to FIG. 7 of a hydraulic circuit 20 for driving the hydraulic cylinders (the boom cylinder 17, the arm cylinder 18 and the bucket cylinder 19) and the hydraulic motors (the left and right traveling hydraulic motors 3, 4, and the revolving hydraulic motor 6).

The hydraulic circuit 20 is provided with the operating devices 12 and the hydraulic cylinders 17, 18, 19 as described above, and further, the engine 21, a hydraulic oil tank 23, the first to fourth closed circuit pumps 31, 41, 51, 61, the first to fourth open circuit pumps 32, 42, 52, 62, a charge pump 71, a charge pressure adjustment apparatus 75, the control device 81, which will be described later, and the like. In addition, the hydraulic circuit 20 is provided with the revolving hydraulic motor 6 and the left and right traveling hydraulic motors 3, 4 as described above, and further, left and right control valves 24, 25 to be described later, and the like.

Here, the hydraulic circuit 20 includes four sets of circuits 30, 40, 50, 60. That is, the hydraulic circuit 20 includes a total of the four sets composed of the first circuit 30 configured as one set of a first closed circuit pump 31 and a first open circuit pump 32, the second circuit 40 configured as one set of a second closed circuit pump 41 and a second open circuit pump 42, the third circuit 50 configured as one set of a third closed circuit pump 51 and a third open circuit pump 52, the fourth circuit 60 configured as one set of a fourth closed circuit pump 61 and a fourth open circuit pump 62, the four sets of the circuits 30, 40, 50, 60 being connected to each other. A charge circuit 70 is connected to the first to fourth circuits 30, 40, 50, 60 each.

The engine 21 is positioned between the cab 9 and the counterweight 11 to be mounted on the revolving frame 8. The engine 21 is configured of, for example, a diesel engine, and acts as a prime mover (rotating source) for rotating the closed circuit pumps 31, 41, 51, 61, the open circuit pumps 32, 42, 52, 62, the charge pump 71 and the like. Here, an output shaft of the engine 21 is connected to a power transmission device 22 for distributing the power of the engine 21. The power transmission device 22 is configured of, for example, a gear mechanism. Each of the pumps 31, 32, 41, 42, 51, 52, 61, 62, 71 is connected to the power transmission device 22. On the other hand, the hydraulic oil tank 23 reserves hydraulic oil therein.

Next, an explanation will be made of the configuration of each of the first to fourth circuits 30, 40, 50, 60. It should be noted that the following explanation will be made primarily of the first circuit 30. In regard to the configuration of the second circuit 40, components identical to those in the first circuit 30 are referred to as numerals (40 to 49C) of No. 40 to No. 49 based upon the rule identical to that of the first circuit 30, and the explanation is omitted. Also in regard to the configuration of the third circuit 50, numerals (50 to 59C) of No. 50 to No. 59 are attached based upon the rule identical to that of the first circuit 30, and the explanation is omitted. Also in regard to the configuration of the fourth circuit 60, numerals (60 to 69C) of No. 60 to No. 69 are attached based upon the rule identical to that of the first circuit 30, and the explanation is omitted.

Figure 3:
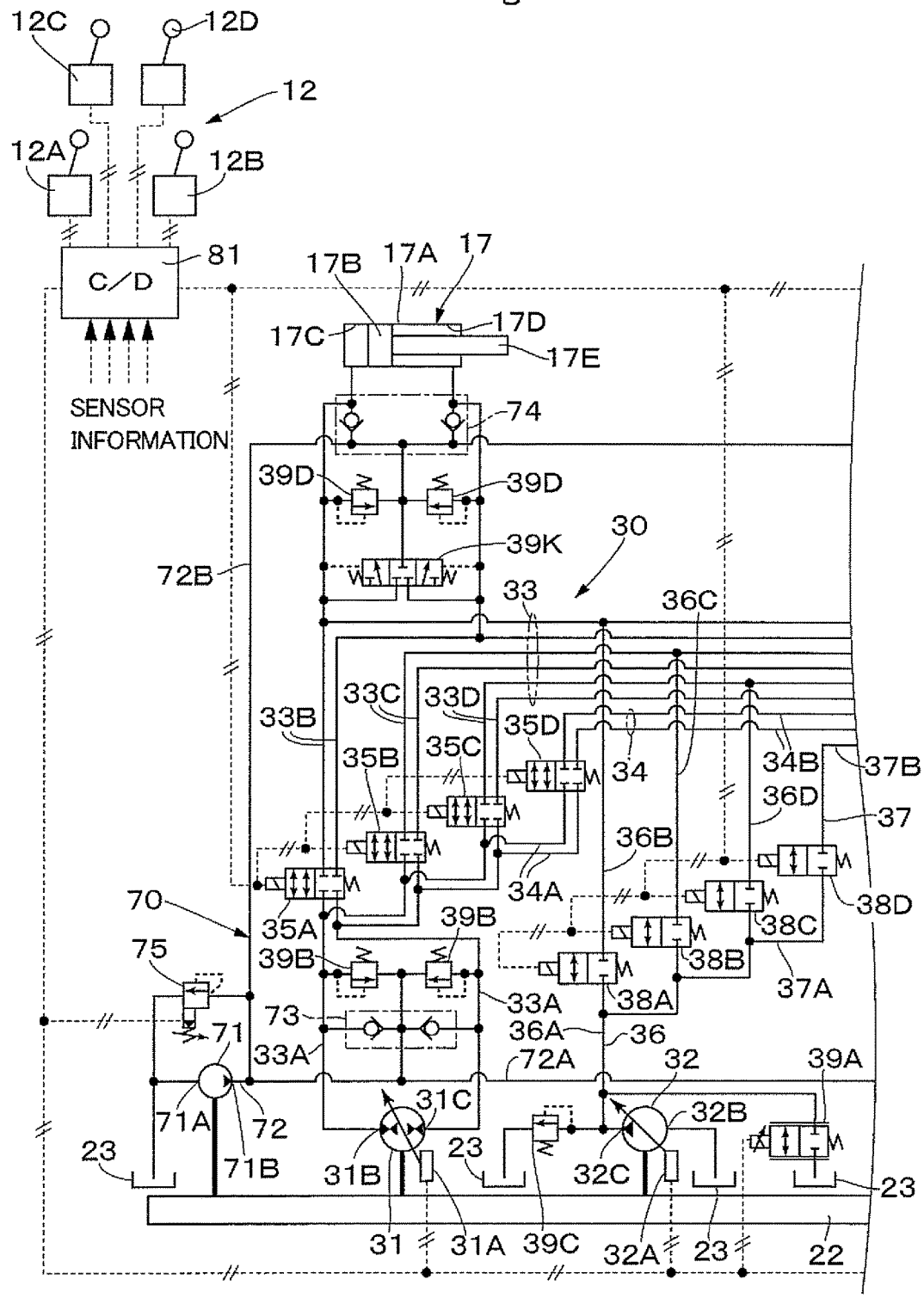
FIG. 3 is an enlarged hydraulic circuit diagram illustrating a boom cylinder and its periphery in FIG. 2.
Figure 4:
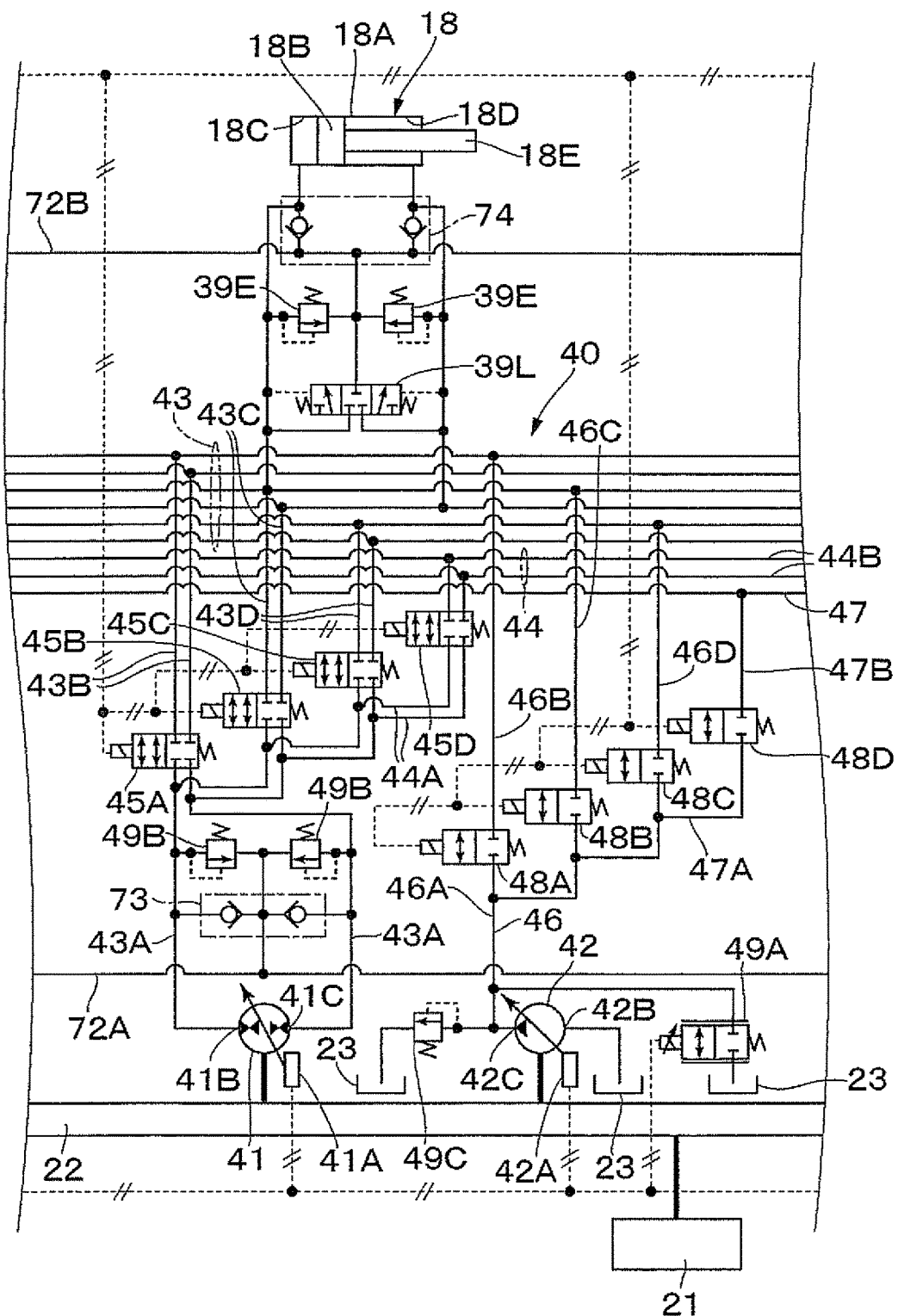
FIG. 4 is an enlarged hydraulic circuit diagram illustrating an arm cylinder and its periphery in FIG. 2.
Figure 5:
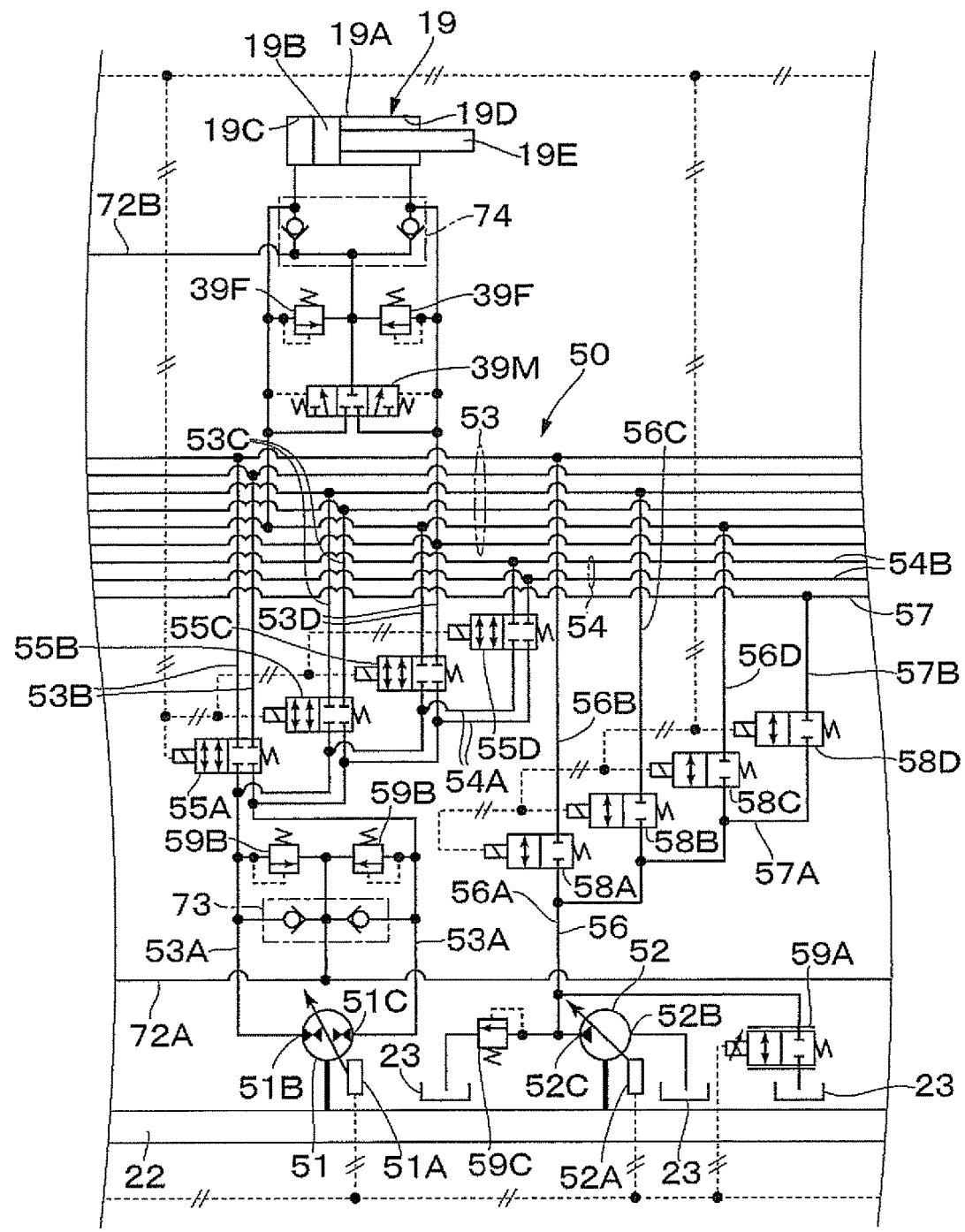
FIG. 5 is an enlarged hydraulic circuit diagram illustrating a bucket cylinder and its periphery in FIG. 2.
Figure 6:
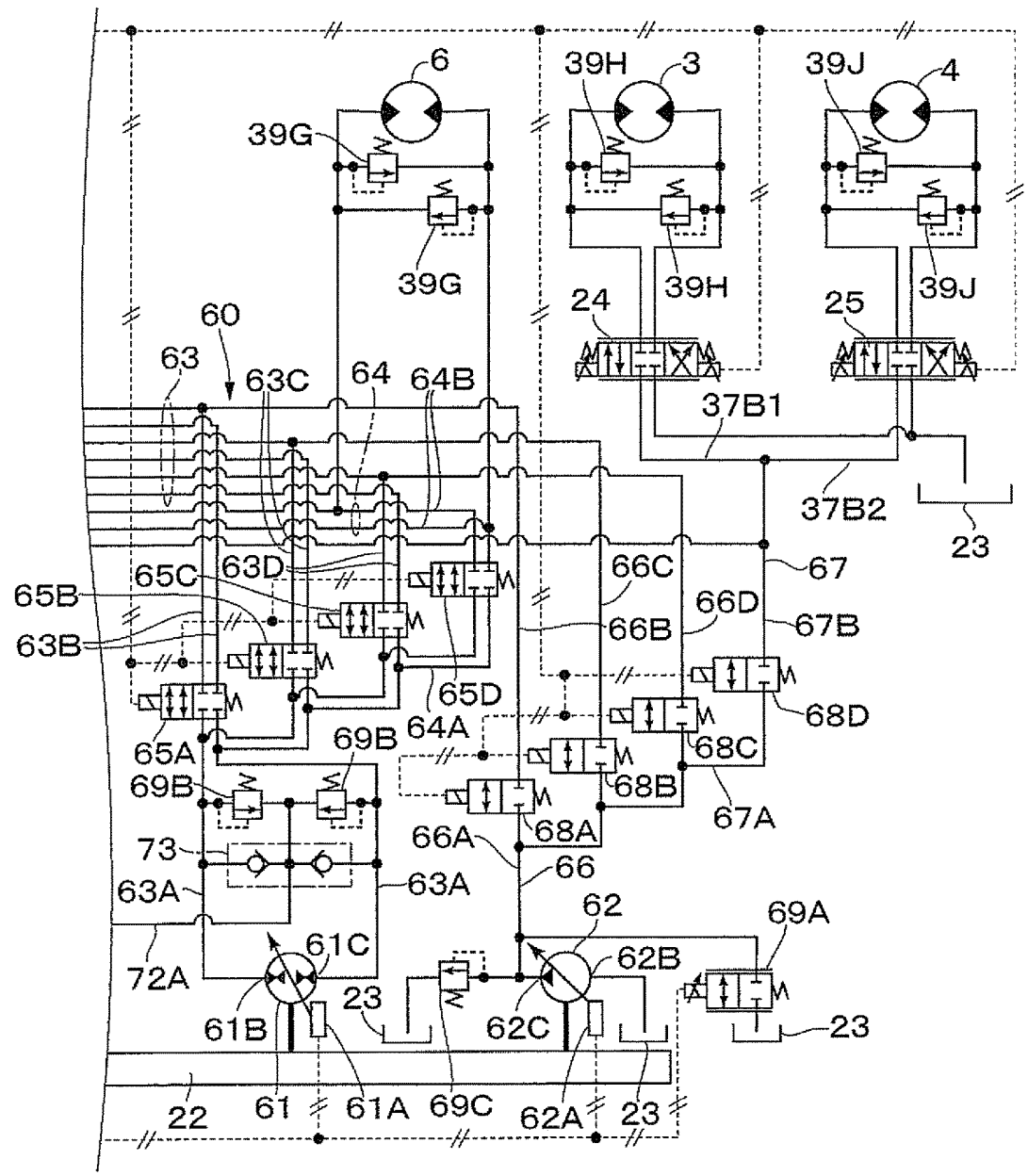
FIG. 6 is an enlarged hydraulic circuit diagram illustrating a revolving hydraulic motor, left and right traveling hydraulic motors and the periphery of them in FIG. 2.
Figure 7:
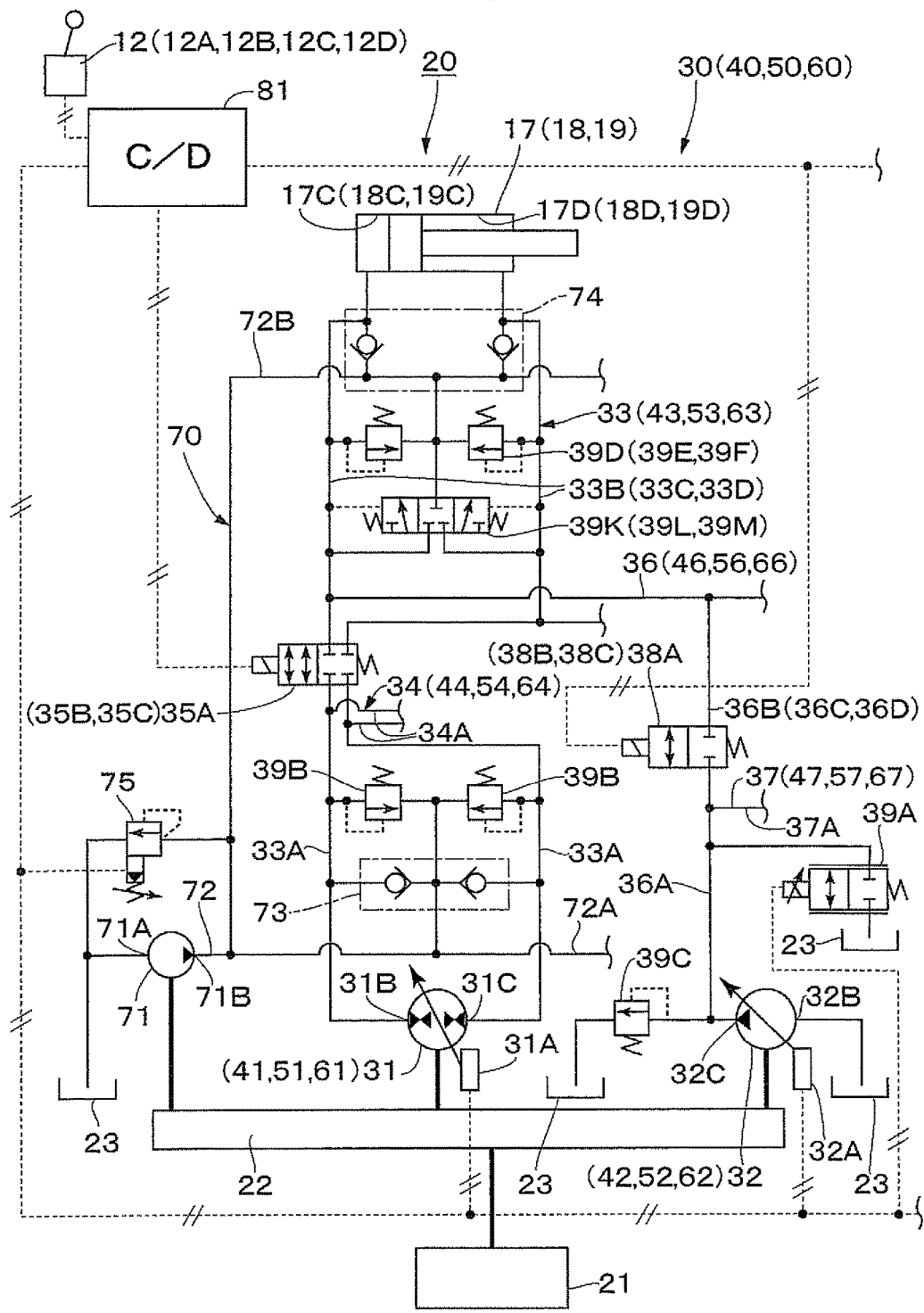
FIG. 7 is a hydraulic circuit diagram illustrating circuits relating to the hydraulic cylinder in FIG. 2 in a simplified manner.

As illustrated in FIG. 3, the first circuit 30 includes the first closed circuit pump 31, the first open circuit pump 32, first cylinder closed circuit switching valves 35A, 35B, 35C, a first motor closed circuit switching valve 35D, first cylinder open circuit switching valves 38A, 38B, 38C, and a first motor open circuit switching valve 38D.

The first closed circuit pump 31 is configured of a swash plate type variable displacement hydraulic pump, an inclined shaft type variable displacement hydraulic pump or a radial piston type variable displacement hydraulic pump, for example, and has a regulator 31A for regulating a pump capacity. The regulator 31A is connected to the control device 81 to be described later via a signal line, and is controlled by a signal from the control device 81. The first closed circuit pump 31 can control both of the flow amount and the delivery direction, and acts also as a hydraulic motor upon receiving supply of pressurized oil (assists the engine 21).

The first closed circuit pump 31 is connected to the bottom side oil chambers 17C, 18C, 19C and the rod side oil chambers 17D, 18D, 19D in the hydraulic cylinders 17, 18, 19 respectively via a cylinder side closed circuit line 33 configuring a closed circuit. Further, the first closed circuit pump 31 is connected to the revolving hydraulic motor 6 of the revolving apparatus 7 via a motor side closed circuit line 34 configuring a closed circuit.

In more detail, the cylinder side closed circuit line 33 includes one set of two pump side closed circuit lines 33A, one set of two boom side closed circuit lines 33B, one set of two arm side closed circuit lines 33C, and one set of two bucket side closed circuit lines 33D. The pump side closed circuit lines 33A connect the first closed circuit pump 31 (each of ports 31B, 31C thereof) and the first cylinder closed circuit switching valves 35A, 35B, 35C which will be described later. The boom side closed circuit lines 33B connect the first cylinder closed circuit switching valve (hereinafter, called the first boom closed circuit switching valve 35A) and the boom cylinder 17 (each of the oil chambers 17C, 17D thereof). The arm side closed circuit lines 33C connect the first cylinder closed circuit switching valve (hereinafter, called the first arm closed circuit switching valve 35B) and the arm cylinder 18 (each of the oil chambers 18C, 18D thereof). The bucket side closed circuit lines 33D connect the first cylinder closed circuit switching valve (hereinafter, called the first bucket closed circuit switching valve 35C) and the bucket cylinder 19 (each of the oil chambers 19C, 19D thereof).

On the other hand, the motor side closed circuit line 34 includes one set of two pump side closed circuit lines 34A, and one set of two revolving side closed circuit lines 34B. The pump side closed circuit lines 34A connect each of the ports 31B, 31C of the first closed circuit pump 31 and a first motor closed circuit switching valve 35D to be described later. In this case, the pump side closed circuit lines 34A are connected to the pump side closed circuit lines 33A of the cylinder side closed circuit line 33. The revolving side closed circuit lines 34B connect the first motor closed circuit switching valve (hereinafter, called the first revolving closed circuit switching valve 35D) and the revolving hydraulic motor 6 of the revolving apparatus 7.

It should be noted that the boom side closed circuit lines 33B of the first circuit 30 are connected to boom side closed circuit lines 43B, 53B, 63B of the second to fourth circuits 40, 50, 60. The arm side closed circuit lines 33C of the first circuit 30 are connected to arm side closed circuit lines 43C, 53C, 63C of the second to fourth circuits 40, 50, 60 respectively. The bucket side closed circuit lines 33D of the first circuit 30 are connected to bucket side closed circuit lines 43D, 53D, 63D of the second to fourth circuits 40, 50, 60 respectively. Further, the revolving side closed circuit lines 34B of the first circuit 30 are connected to revolving side closed circuit lines 44B, 54B, 64B of the second to fourth circuits 40, 50, 60 respectively.

The first closed circuit pump 31 has the two ports 31B, 31C enabling both-direction delivery, that is, the bottom side both-direction port 31B connected to the bottom side oil chambers 17C, 18C, 19C of the hydraulic cylinders 17, 18, 19 respectively, and the rod side both-direction port 31C connected to the rod side oil chambers 17D, 18D, 19D of the hydraulic cylinders 17, 18, 19 respectively. Here, the bottom side both-direction port 31B as one port acts as a suction port upon suctioning the hydraulic oil from the bottom side oil chambers 17C, 18C, 19C, and acts as a delivery port upon delivering the hydraulic oil toward the bottom side oil chambers 17C, 18C, 19C.

On the other hand, the rod side both-direction port 31C as the other port acts as a suction port upon suctioning the hydraulic oil from the rod side oil chambers 17D, 18D, 19D, and acts as a delivery port upon delivering hydraulic oil toward the rod side oil chambers 17D, 18D, 19D. Further, the bottom side both-direction port 31B and the rod side both-direction port 31C act as suction ports upon suctioning the hydraulic oil from the revolving hydraulic motor 6, and act as delivery ports upon delivering the hydraulic oil toward the revolving hydraulic motor 6 in response to a rotating direction of the revolving hydraulic motor 6.

The respective ports 31B, 31C of the first closed circuit pump 31 are connected to the respective closed circuit switching valves 35A, 35B, 35C, 35D via the pump side closed circuit lines 33A, 34A. Each of the closed circuit switching valves 35A, 35B, 35C, 35D is configured of an electromagnetic switching valve having four ports and two positions, for example, and is connected to the control device 81 via a signal line. Each of the closed circuit switching valves 35A, 35B, 35C, 35D switches communication (open state) and blocking (closed state) of the flow passage in response to a signal from the control device 81. Each of the closed circuit switching valves 35A, 35B, 35C, 35D becomes in a blocking (closed) state in a case of no power supply where the signal is not input thereto from the control device 81.

When the first boom closed circuit switching valve 35A is in a communicative state, the first closed circuit pump 31 is connected to the boom cylinder 17 to form a closed circuit. That is, the one port 31B of the first closed circuit pump 31 is connected to the bottom side oil chamber 17C of the boom cylinder 17 and the other port 31C is connected to the rod side oil chamber 17D of the boom cylinder 17 to form a closed circuit. When the first arm closed circuit switching valve 35B is in a communicative state, the first closed circuit pump 31 is connected to the arm cylinder 18 to form a closed circuit. That is, the one port 31B of the first closed circuit pump 31 is connected to the bottom side oil chamber 18C of the arm cylinder 18 and the other port 31C is connected to the rod side oil chamber 18D of the arm cylinder 18 to form a closed circuit.

When the first bucket closed circuit switching valve 35C is in a communicative state, the first closed circuit pump 31 is connected to the bucket cylinder 19 to form a closed circuit. That is, the one port 31B of the first closed circuit pump 31 is connected to the bottom side oil chamber 19C of the bucket cylinder 19 and the other port 31C is connected to the rod side oil chamber 19D of the bucket cylinder 19 to form a closed circuit. When the first revolving closed circuit switching valve 35D is in a communicative state, the first closed circuit pump 31 is connected to the revolving hydraulic motor 6 to form a closed circuit. That is, the one port 31B of the first closed circuit pump 31 is connected to one port of the revolving hydraulic motor 6, and the other port 31C is connected to the other port of the revolving hydraulic motor 6 to form a closed circuit.

On the other hand, the first open circuit pump 32 is configured of a swash plate type variable displacement hydraulic pump, an inclined shaft type variable displacement hydraulic pump or a radial piston type variable displacement hydraulic pump, for example, and has a regulator 32A for regulating the pump capacity. The regulator 32A is connected to the control device 81 to be described later via a signal line, and is controlled by a signal from the control device 81.

The first open circuit pump 32 is connected to the bottom side oil chambers 17C, 18C, 19C in the hydraulic cylinders 17, 18, 19 respectively via a cylinder side open circuit line 36 configuring an open circuit. Further, the first open circuit pump 32 is connected to the left and right traveling hydraulic motors 3, 4 via a motor side open circuit line 37 configuring an open circuit.

In more detail, the cylinder side open circuit line 36 includes a pump side open circuit line 36A, a boom side open circuit line 36B, an arm side open circuit line 36C, and a bucket side open circuit line 36D. The pump side open circuit line 36A connects a delivery port 32C of the first open circuit pump 32 and the first cylinder open circuit switching valves 38A, 38B, 38C to be described later. The boom side open circuit line 36B connects the first cylinder open circuit switching valve (hereinafter, called the first boom open circuit switching valve 38A) and the bottom side oil chamber 17C of the boom cylinder 17. Therefore, the boom side open circuit line 36B is connected to one line 33B of one set of the two boom side closed circuit lines 33B, that is, to the midway point of the line 33B leading to the bottom side oil chamber 17C.

The arm side open circuit line 36C connects the first cylinder open circuit switching valve (hereinafter, called the first arm open circuit switching valve 38B) and the bottom side oil chamber 18C of the arm cylinder 18. Therefore, the arm side open circuit line 36C is connected to one line 33C of one set of the two arm side closed circuit lines 33C, that is, to the midway point of the line 33C leading to the bottom side oil chamber 18C. The bucket side open circuit line 36D connects the first cylinder open circuit switching valve (hereinafter, called the first bucket open circuit switching valve 38C) and the bottom side oil chamber 19C of the bucket cylinder 19. Therefore, the bucket side open circuit line 36D is connected to one line 33D of one set of the two bucket side closed circuit lines 33D, that is, to the midway point of the line 33D leading to the bottom side oil chamber 19C.

On the other hand, the motor side open circuit line 37 includes a pump side open circuit line 37A, and a traveling side open circuit line 37B. The pump side open circuit line 37A connects a delivery port 32C of the first open circuit pump 32 and the first motor open circuit switching valve 38D to be described later. In this case, the pump side open circuit line 37A is connected to the pump side open circuit line 36A of the cylinder side open circuit line 36. The traveling side open circuit line 37B connects the first motor open circuit switching valve (hereinafter, called the first traveling open circuit switching valve 38D) and the left and right traveling hydraulic motors 3, 4. The traveling side open circuit line 37B is branched into a left traveling side open circuit line 37B1 and a right traveling side open circuit line 37B2 along the way.

The left traveling side open circuit line 37B1 is connected to the left traveling hydraulic motor 3 via the left control valve 24, and the right traveling side open circuit line 37B2 is connected to the right traveling hydraulic motor 4 via the right control valve 25. The left and right control valves 24, 25 each are configured of an electromagnetic proportional direction control valve having four ports and three positions, for example, and are connected to the control device 81 to be described later via signal lines. The left and right control valves 24, 25 are controlled according to a command of the control device 81 to adjust rotating directions and rotating speeds of the left and right traveling hydraulic motors 3, 4.

It should be noted that the boom side open circuit line 36B of the first circuit 30 is connected to boom side open circuit lines 46B, 56B, 66B of the second to fourth circuits 40, 50, 60 respectively. The arm side open circuit line 36C of the first circuit 30 is connected to arm side open circuit lines 46C, 56C, 66C of the second to fourth circuits 40, 50, 60 respectively. The bucket side open circuit line 36D of the first circuit 30 is connected to bucket side open circuit lines 46D, 56D, 66D of the second to fourth circuits 40, 50, 60 respectively. Further, the traveling side open circuit line 37B of the first circuit 30 is connected to traveling side open circuit lines 47B, 57B, 67B of the second to fourth circuits 40, 50, 60 respectively.

The first open circuit pump 32 has a suction port 32B that suctions hydraulic oil in the hydraulic oil tank 23, and a delivery port 32C that delivers the suctioned hydraulic oil toward the bottom side oil chambers 17C, 18C, 19C in the hydraulic cylinders 17, 18, 19 or the left and right traveling hydraulic motors 3, 4. That is, the suction port 32B of the first open circuit pump 32 is connected to the hydraulic oil tank 23. On the other hand, the delivery port 32C of the first open circuit pump 32 is connected to each of the open circuit switching valves 38A, 38B, 38C, 38D via the pump side open circuit lines 36A, 37A. In addition thereto, the delivery port 32C of the first open circuit pump 32 is connected also to a first bleed-off valve 39A, and is connected to the hydraulic oil tank 23 via the first bleed-off valve 39A. The first bleed-off valve 39A is configured of an electromagnetic proportional direction control valve having two ports and two positions, for example, and is connected to the control device 81 via a signal line.

On the other hand, each of the open circuit switching valves 38A, 38B, 38C, 38D is configured of an electromagnetic switching valve having two ports and two positions, for example, and is connected to the control device 81 via a signal line. Each of the open circuit switching valves 38A, 38B, 38C, 38D switches communication (open state) and blocking (closed state) of the flow passage in response to a signal from the control device 81. Each of the open circuit switching valves 38A, 38B, 38C, 38D becomes in a blocking (closed) state in a case of no power supply where a signal is not input thereto from the control device 81.

When the first boom open circuit switching valve 38A is in a communicative state, the delivery port 32C of the first open circuit pump 32 is connected to the bottom side oil chamber 17C of the boom cylinder 17 to form an open circuit. When the first arm open circuit switching valve 38B is in a communicative state, the delivery port 32C of the first open circuit pump 32 is connected to the bottom side oil chamber 18C of the arm cylinder 18 to form an open circuit. When the first bucket open circuit switching valve 38C is in a communicative state, the delivery port 32C of the first open circuit pump 32 is connected to the bottom side oil chamber 19C of the bucket cylinder 19 to form an open circuit. When the first traveling open circuit switching valve 38D is in a communicative state, the delivery port 32C of the first open circuit pump 32 is connected to the left and right traveling hydraulic motors 3, 4 via the left and right control valves 24, 25 to form an open circuit.

It should be noted that a first pump side closed circuit relief valve 39B is provided between the pump side closed circuit line 33A and a charge line 72 to be described later. In addition, a first pump side open circuit relief valve 39C is provided also between the pump side open circuit line 36A and the hydraulic oil tank 23. Cylinder side closed circuit relief valves 39D, 39E, 39F are provided respectively between the boom side closed circuit line 33B and the charge line 72, between the arm side closed circuit line 33C and the charge line 72, and between the bucket side closed circuit line 33D and the charge line 72. Further, the revolving side closed circuit line 34B is provided with a revolving motor relief valve 39G, and the left traveling side open circuit line 37B1 and the right traveling side open circuit line 37B2 are provided with traveling motor relief valves 39H, 39J. Each of the relief valves 39B, 39C, 39D, 39E, 39F, 39G, 39H, 39J releases the hydraulic oil to the hydraulic oil tank 23 at a preset pressure or more, thus suppressing damage of each pump and each line.

On the other hand, flashing valves 39K, 39L, 39M are provided respectively between the boom side closed circuit line 33B and the charge line 72, between the arm side closed circuit line 33C and the charge line 72, and between the bucket side closed circuit line 33D and the charge line 72. The flashing valves 39K, 39L, 39M each have a role of performing discharge and suction of the hydraulic oil in the closed circuit to a low-pressure line.

Next, an explanation will be made of the configuration of the charge circuit 70. It should be noted that the following explanation will be made by taking a relationship between the charge circuit 70 and the first circuit 30 as an example.

The charge circuit 70 includes a charge pump 71, check valves 73, 74, and a charge pressure adjustment apparatus 75. The charge pump 71 is configured of, for example, a swash plate type fixed displacement hydraulic pump, an inclined shaft type fixed displacement hydraulic pump or a radial piston type fixed displacement hydraulic pump, and has a suction port 71A for suctioning hydraulic oil in the hydraulic oil tank 23, and a delivery port 71B for delivering the suctioned hydraulic oil to the charge line 72. Here, the charge line 72 connects the delivery port 71B of the charge pump 71 and the cylinder side closed circuit line 33 (43, 53, 63).

Specifically, the charge line 72 has a pump side charge line 72A for connecting the charge pump 71 and the pump side closed circuit line 33A (43A, 53A, 63A). In addition, the charge line 72 has a cylinder side charge line 72B for connecting the charge pump 71, and the boom side closed circuit line 33B (43B, 53B, 63B), the arm side closed circuit line 33C (43C, 53C, 63C) and the bucket side closed circuit line 33D (43D, 53D, 63D).

In addition, the charge pump 71 is connected to the pump side closed circuit line 33A (43A, 53A, 63A) via the pump side charge line 72A and the pump side check valve 73. In addition, the charge pump 71 is connected to the boom side closed circuit line 33B (43B, 53B, 63B), the arm side closed circuit lines 33C (43C, 53C, 63C), and the bucket side closed circuit line 33D (43D, 53D, 63D) respectively via the cylinder side charge line 72B and the cylinder side check valve 74.

The charge pump 71 supplements hydraulic oil to the cylinder side closed circuit lines 33, 34, 53, 63 via the check valves 73, 74. That is, the pressure in the closed circuit lines 33A, 33B, 33C, 33D decreases to be lower than the pressure in the charge line 72, the hydraulic oil from the charge pump 71 is supplied to the closed circuit lines 33A, 33B, 33C, 33D via the check valves 73, 74 to suppress cavitation in the closed circuit lines 33A, 33B, 33C, 33D.

The charge pressure adjustment apparatus 75 is provided between the charge line 72 and the hydraulic oil tank 23. The charge pressure adjustment apparatus 75 is configured of a set pressure variable type relief valve, for example, an electromagnetic proportional relief valve, and is connected to the control device 81 to be described later via a signal line. The charge pressure adjustment apparatus 75 is controlled in response to a command of the control device 81, and variably adjusts the pressure in the charge line 72 (charge pressure). As described later, in the first embodiment, the charge pressure adjustment apparatus 75 is controlled by the control device 81 in such a manner as to increase the pressure in the bottom side of the hydraulic cylinders 17, 18, 19 in accordance with an operating amount of the operating device 12. Specifically, in response to an operating amount of the operating device 12, for example, when the operating amount exceeds a preset threshold value, the charge pressure adjustment apparatus 75 is controlled based upon a command from the control device 81 to increase a set pressure (relief set pressure) and increase the pressure in the charge line 72 (charge pressure).

The control device 81 acts as a controller (C/D: control device, C/U: control unit) that controls the first to fourth closed circuit pumps 31, 41, 51, 61, the first to fourth open circuit pumps 32, 42, 52, 62, the charge pressure adjustment apparatus 75, and the like in accordance with an operation of the operating device 12. The control device 81 includes, for example, a microcomputer and the like, and the input side is connected to the operating device 12, unillustrated various sensors, and the like. The output side of the control device 81 is connected to, for example, in relation to the first circuit 30, a regulator 31A of the first closed circuit pump 31, a regulator 32A of the first open circuit pump 32, the first respective switching valves 35A, 35B, 35C, 35D, 38A, 38B, 38C, 38D, and the first bleed-off valve 39A respectively. The connection relation in each of the second circuit 40, the third circuit 50 and the fourth circuit 60 is the same as the above. Further, the output side of the control device 81 is connected also to the left and right control valves 24, 25, the charge pressure adjustment apparatus 75 and the like.

The control device 81 controls the first to fourth closed circuit pumps 31, 41, 51, 61, the first to fourth open circuit pumps 32, 42, 52, 62, the first to fourth respective switching valves (the numerals are omitted), the first to fourth bleed-off valves 39A, 49A, 59A, 69A, the control valves 24, 25, the charge pressure adjustment apparatus 75, and the like, based upon a command value from the operating device 12 and information of various sensors (detection values, state amounts). Therefore, the control device 81 has a memory unit (not illustrated) composed of a ROM, a RAM and the like, and this memory unit stores therein process programs for controlling the aforementioned control targets based upon an operating amount of the operating device 12 and information of various sensors, and the like. In addition thereto, the memory unit also stores therein a process program for controlling the charge pressure adjustment apparatus 75 (increasing the set pressure) in such a manner as to increase the pressure in the bottom side in the hydraulic cylinders 17, 18, 19 in accordance with an operating amount of the operating device 12, upon extending the hydraulic cylinders 17, 18, 19. The control process that will be executed in the control device 81 will be in detail described later.

Next, an explanation will be made of an operation of the hydraulic circuit 20, that is, operations of the first to fourth circuits 30 to 60 with reference to FIG. 8.

Figure 8:
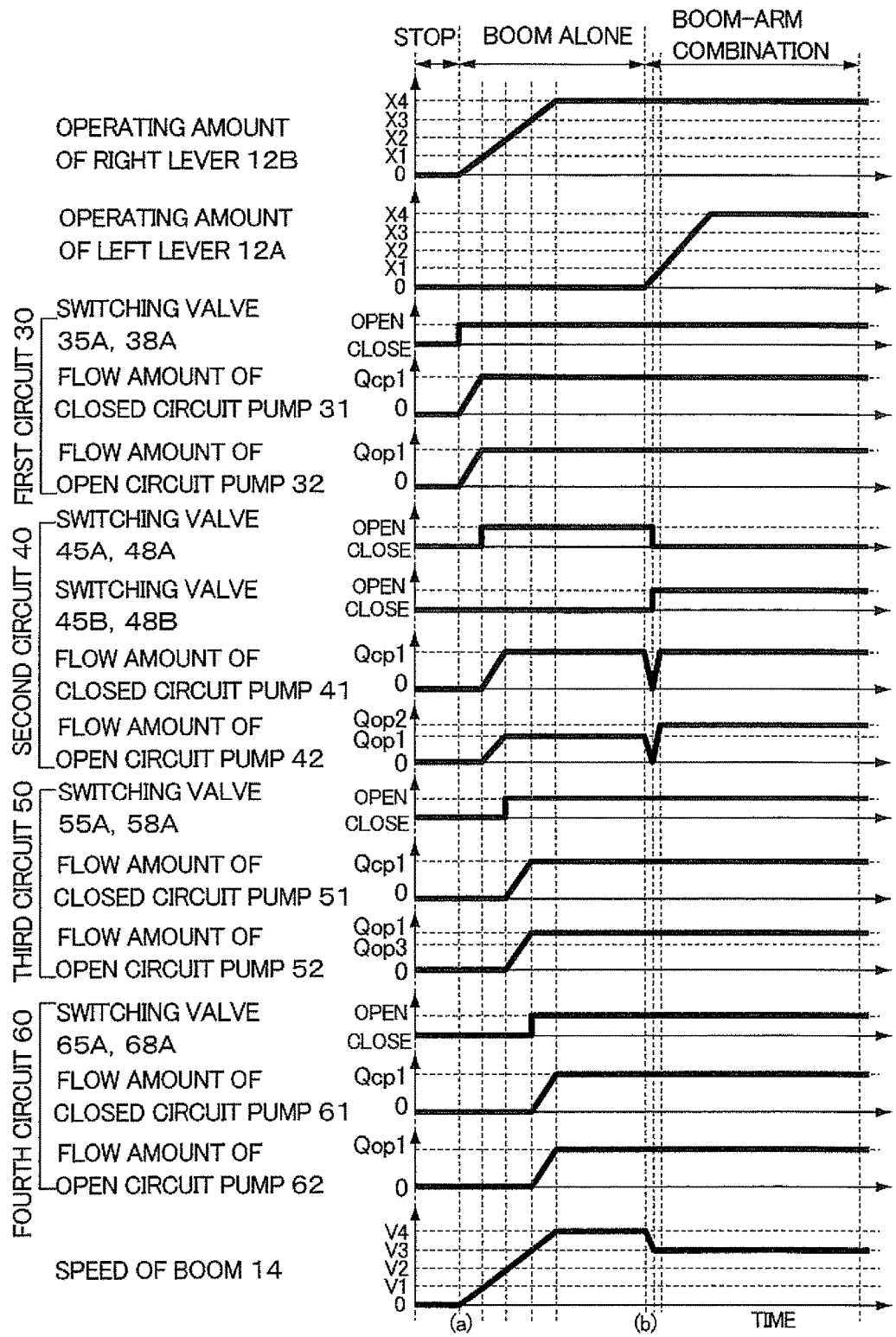
FIG. 8 is a characteristic line diagram illustrating an example of a change with time at the time of operating a working machine.

FIG. 8 illustrates a change with time of each part in the hydraulic circuit 20 when the hydraulic cylinder transitions from a stop state, then to a single operation of the boom 14 (boom cylinder 17), and to a combined operation of the boom 14 (boom cylinder 17) and the arm 15 (arm cylinder 18). In the following explanation, the first to fourth closed circuit pumps 31, 41, 51, 61 are assumed to have the same capacity.

First, when the hydraulic cylinder is in the stop state, that is, when the left and right levers 12A, 12B are not operated, the first to fourth closed circuit pumps 31, 41, 51, 61 and the first to fourth open circuit pumps 32, 42, 52, 62 are controlled to the minimum inclined angle, and the delivery flow amount is equal to zero. In addition, the respective switching valves (the numerals are omitted) and the control valves 24, 25 are all in a blocking state (closed). Therefore, the boom cylinder 17, the arm cylinder 18, the bucket cylinder 19, the revolving hydraulic motor 6, the left and right traveling hydraulic motors 3, 4 are held in a stop state.

Next, for example, when the right lever 12B is operated for performing a lifting operation of the boom 14 alone in a time point (a) on a time axis, the control device 81 controls the regulator 31A of the first closed circuit pump 31 to incline a swash plate of the first closed circuit pump 31. In addition, the control device 81 controls the regulator 32A of the first open circuit pump 32 to incline a swash plate of the first open circuit pump 32. Until an operating amount of the right lever 12B reaches X1, a delivery flow amount Qc of the first closed circuit pump 31 is indicated at Qcp1, and a delivery flow amount Qo of the first open circuit pump 32 is indicated at Qop1. In this case, the control device 81 determines the delivery flow amounts Qcp1 and Qop1 such that an area ratio "Aa1:Aa2" of an area (pressure-receiving area) Aa1 of the bottom side oil chamber 17C in the boom cylinder 17 and an area (pressure-receiving area) Aa2 of the rod side oil chamber 17D in the boom cylinder 17 is approximately equal to a ratio "(Qcp1+Qop1):Qcp1" of a supply flow amount and a discharge flow amount of hydraulic oil to the bottom side oil chamber 17C and the rod side oil chamber 17D by both the hydraulic pumps 31, 32.

The control device 81 controls the delivery flow amount Qc of the first closed circuit pump 31 and the delivery flow amount Qo of the first open circuit pump 32 to change (increase) while maintaining a ratio therebetween to be "Qcp1:Qocp1". The control device 81 controls the first closed circuit pump 31 and the first open circuit pump 32 to deliver hydraulic oil, and at the same time, controls the first boom closed circuit switching valve 35A and the first boom open circuit switching valve 38A to communicate (open). As a result, when the operating amount of the right lever 12B reaches X1, an operating speed V of the boom 4 (boom cylinder 17) becomes V1.

When the operating amount of the right lever 12B exceeds X1, the control device 81 controls a regulator 41A of the second closed circuit pump 41 to incline a swash plate of the second closed circuit pump 41. In addition, the control device 81 controls a regulator 42A of the second open circuit pump 42 to incline a swash plate of the second open circuit pump 42. Until the operating amount of the right lever 12B reaches X2, a delivery flow amount Qc of the second closed circuit pump 41 is indicated at Qcp1, and a delivery flow amount Qo of the second open circuit pump 42 is indicated at Qop1. The control device 81 controls the delivery flow amount Qc of the second closed circuit pump 41 and the delivery flow amount Qo of the second open circuit pump 42 to change (increase) while maintaining a ratio therebetween to be "Qcp1:Qop1". The control device 81 controls the second closed circuit pump 41 and the second open circuit pump 42 to deliver hydraulic oil, and at the same time, controls the second boom closed circuit switching valve 45A and the second boom open circuit switching valve 48A to communicate (open). As a result, when the operating amount of the right lever 12B reaches X1, the operating speed V of the boom 14 (boom cylinder 17) becomes V2.

When the operating amount of the right lever 12B exceeds X2, the control device 81 controls a regulator 51A of the third closed circuit pump 51 to incline a swash plate of the third closed circuit pump 51. In addition, the control device 81 controls a regulator 52A of the third open circuit pump 52 to incline a swash plate of the third open circuit pump 52. Until the operating amount of the right lever 12B reaches X3, a delivery flow amount Qc of the third closed circuit pump 51 is indicated at Qcp1, and a delivery flow amount Qo of the third open circuit pump 52 is indicated at Qop1. The control device 81 controls the delivery flow amount Qc of the third closed circuit pump 51 and the delivery flow amount Qo of the third open circuit pump 52 to change (increase) while maintaining a ratio therebetween to be "Qcp1:Qop1". The control device 81 controls the third closed circuit pump 51 and the third open circuit pump 52 to deliver hydraulic oil, and controls the third boom closed circuit switching valve 55A and the third boom open circuit switching valve 58A to communicate (open). As a result, when the operating amount of the right lever 12B reaches X3, the operating speed V of the boom 14 (boom cylinder 17) becomes V3.

When the operating amount of the right lever 12B exceeds X3, the control device 81 controls a regulator 61A of the fourth closed circuit pump 61 to incline a swash plate of the fourth closed circuit pump 61. In addition, the control device 81 controls a regulator 62A of the fourth open circuit pump 62 to incline a swash plate of the fourth open circuit pump 62. Until the operating amount of the right lever 12B reaches X4, a delivery flow amount Qc of the fourth closed circuit pump 61 is indicated at Qcp1, and a delivery flow amount Qo of the fourth open circuit pump 62 is indicated at Qop1. The control device 81 controls the delivery flow amount Qc of the fourth closed circuit pump 61 and the delivery flow amount Qo of the fourth open circuit pump 62 while maintaining a ratio therebetween to be "Qcp1:Qop1". The control device 81 controls the fourth closed circuit pump 61 and the fourth open circuit pump 62 to deliver hydraulic oil, and at the same time, controls the fourth boom closed circuit switching valve 65A and the fourth boom open circuit switching valve 68A to communicate (open). As a result, when the operating amount of the right lever 12B reaches X4, the operating speed V of the boom 14 (boom cylinder 17) becomes V4.

Subsequently, it is assumed that the left lever 12A is operated for performing, in addition to a lifting operation of the arm alone, an operation of the boom (for example, the arm crowding) in a time point (b) on a time axis. As a result, the hydraulic cylinder transitions from the single operation of the boom cylinder 17 when the operating amount of the right lever 12B is made to X4 to the combined operation of the boom cylinder 17 and the arm cylinder 18 in a state where the operating amount of the right lever 12B is maintained to X4. At this time, the control device 81 controls the regulator 41A of the second closed circuit pump 41 to return the swash plate of the second closed circuit pump 41 back to the minimum inclined angle, thus making the delivery flow amount Qc zero. In addition, the control device 81 controls the regulator 42A of the second open circuit pump 42 to return the swash plate of the second open circuit pump 42 back to the minimum inclined angle, thus making the delivery flow amount Qo zero. When the delivery flow amounts Qc, Qo of both the pumps 41, 42 become zero, the control device 81 controls the second boom closed circuit switching valve 45A and the second boom open circuit switching valve 48A to be in a non-communicative state (blocking, closed state), and thereafter, controls the second arm closed circuit switching valve 45B and the second arm open circuit switching valve 48B to communicate (open).

The control device 81 controls the second arm closed circuit switching valve 45B and the second arm open circuit switching valve 48B to communicate, and at the same time, controls the regulator 41A of the second closed circuit pump 41 to incline the swash plate of the second closed circuit pump 41, and further, controls the regulator 42A of the second open circuit pump 42 to incline the swash plate of the second open circuit pump 42. Until the operating amount of the left lever 12A reaches X1, a delivery flow amount Qc of the second closed circuit pump 41 is indicated at Qcp1, and a delivery flow amount Qo of the second open circuit pump 42 is indicated at Qop2.

In this case, the control device 81 determines the delivery flow amounts Qcp1 and Qop2 such that an area ratio "Ab1:Ab2" of an area Ab1 of the bottom side oil chamber 18C in the arm cylinder 18 and an area Ab2 of the rod side oil chamber 18D in the arm cylinder 18 is approximately equal to a ratio "(Qcp1+Qop2):Qcp1" of supply and discharge of the hydraulic oil to the bottom side oil chamber 18C and the rod side oil chamber 18D by both the hydraulic pumps 41, 42. The control device 81 controls the delivery flow amount Qc of the second closed circuit pump 41 and the delivery flow amount Qo of the second open circuit pump 42 to change (increase), while maintaining a ratio therebetween to be "Qcp1:Qop2".

Thus, when the left lever 12A is operated, the second boom closed circuit switching valve 45A and the second boom open circuit switching valve 48A become in a non-communicative state (blocking, closed state), so that the hydraulic oil to be supplied to the boom cylinder 17 is reduced by the amount corresponding to the delivery flow amount Qcp1 of the second closed circuit pump 41 and the delivery flow amount Qop2 of the second open circuit pump 42. As a result, the operating speed V of the boom 14 (boom cylinder 17) becomes V3. Although the illustration is omitted, when the operating amount of the left lever 12A becomes zero, the left lever 12A is returned back to an original state, and the operating speed V of the boom 14 (boom cylinder 17) becomes V4.

As described above, at the single operation, that is, when a single hydraulic actuator (for example, boom cylinder 17) only is operated and the remaining hydraulic actuators (for example, the arm cylinder 18, the bucket cylinder 19, the revolving hydraulic motor 6, the left and right traveling hydraulic motors 3, 4) are not operated, the maximum speed of the boom cylinder 17 can be increased by combining all the hydraulic pumps 31, 32, 41, 42, 51, 52, 61, 62. On the other hand, at the combined operations, that is, when two or more of the hydraulic actuators 17, 18, 19, 6, 3, 4 are operated, the hydraulic pumps 31, 32, 41, 42, 51, 52, 61, 62 can be allotted respectively to the hydraulic actuators 17, 18, 19, 6, 3, 4 to be operated. In this case, six combined operations at the maximum are made possible.

In addition, at the combined operations, a lot of the hydraulic pumps 31, 32, 41, 42, 51, 52, 61, 62 can be combined with the hydraulic actuators having a high operation frequency among the respective hydraulic actuators 17, 18, 19, 6, 3, 4. Therefore, the priority order of the hydraulic actuators 17, 18, 19, 6, 3, 4 to be connected to the hydraulic pumps 31, 32, 41, 42, 51, 52, 61, 62 can be preliminarily set for each of the hydraulic pumps 31, 32, 41, 42, 51, 52, 61, 62. In this case, for example, a map in regard to the priority order is stored in the memory unit in the control device 81, and the hydraulic actuators 17, 18, 19, 6, 3, 4 can be connected to the hydraulic pumps 31, 32, 41, 42, 51, 52, 61, 62 based upon this map.

An explanation will be made of a behavior of the arm 15 in a case of operating the arm 15 alone and at high speeds in the air (for example, case of performing the arm crowding at the maximum speed Va).

First, FIG. 11 illustrates a behavior of the arm 15 according to a comparative example. In this comparative example, a set pressure (set charge pressure) of the charge pressure adjustment apparatus 75 is fixed to be constant, that is, a relief pressure of the charge line 72 is fixed to a constant value (Pc1). In other words, the comparative example corresponds to the configuration where a relief valve of a set pressure fixing type is provided in the charge line 72.

When the operating amount of the left lever 12A is made to X4 at the maximum for operating the arm 15, the closed circuit pumps 31, 41, 51, 61 deliver the maximum total flow amount Qcp4, and the open circuit pumps 32, 42, 52, 62 deliver the maximum total flow amount Qop4. As a result, the arm cylinder 18 performs an extension operation at the maximum speed, and the arm 15 performs the operation (arm crowding) at the maximum speed Va. As similar to the aforementioned single operation of the boom 14, the control device 81 determines the maximum total flow amounts Qcp4 and Qop4 such that an area ratio "Aa3:Aa4" of an area Aa3 of the bottom side oil chamber 18C in the arm cylinder 18 and an area Aa4 of the rod side oil chamber 18D in the arm cylinder 18 is approximately equal to a ratio "(Qcp4+Qop4):

Qcp4" of a supply flow amount and a discharge flow amount of the hydraulic oil to the bottom side oil chamber 18C and the rod side oil chamber 18D by the closed circuit pumps 31, 41, 51, 61 and the open circuit pumps 32, 42, 52, 62. It should be noted that here, as illustrated in FIG. 1, the arm crowding of operating the arm 15 in the air from the extended posture to the bent posture is performed.

In a stop state of the arm 15 at time T0, the pressure in the rod side oil chamber 18D of the arm cylinder 18 becomes a high pressure with the self-weight of the arm 15 and the bucket 16, and the pressure in the bottom side oil chamber 18C is maintained in a charge pressure Pc1 regulated in the charge pressure adjustment apparatus 75 because of no application of loads to the bottom side oil chamber 18C. In the first half of the arm crowding from time T1 to time T3, the closed circuit pumps 31, 41, 51, 61 suction highly pressurized oil discharged from the rod side oil chamber 18D of the arm cylinder 18 and deliver it to the bottom side oil chamber 18C. However, due to an internal leak in the hydraulic pump, the closed circuit pumps 31, 41, 51, 61 deliver the flow amount smaller than the suctioned flow amount. Therefore, the hydraulic oil is inclined to lack in the bottom side oil chamber 18C. However, the hydraulic oil corresponding to the lack amount is delivered via the check valves 73, 74 or the flashing valves 39K, 39L, 39M from the charge pump 71 to the bottom side oil chamber 18C. In this case, when the cylinder speed (extension speed) of the arm cylinder 18 is low, the pressure in the bottom side oil chamber 18C is held to the charge pressure Pc1.

However, upon increasing the flow amount of the closed circuit pumps 31, 41, 51, 61 for operating the arm cylinder 18 at high speeds, the leak flow amount from the closed circuit pumps 31, 41, 51, 61 increases corresponding to the increased flow amount and the flow amount of the hydraulic oil to be supplemented to the closed circuit (the boom side closed circuit line 33B and the pump side closed circuit line 33A) from the charge line (charge line 72) also increases. At this time, the pressure in the charge line (charge line 72) cannot be held to the charge pressure Pc1 regulated by the relief valve (charge pressure adjustment apparatus 75 having fixed the set pressure) due to an increasing pressure loss by the resistance of the check valves 73, 74 or the line resistance. As a result, as illustrated in FIG. 11, the pressure (bottom pressure) in the bottom side oil chamber 18C is reduced excessively, and specifically the bottom pressure is reduced to an atmospheric pressure of approximately zero.

On the other hand, in the latter half of the arm crowding having passed the load direction reversing position R (Refer to FIG. 1), it is necessary to lift up the arm 15 by increasing the pressure in the bottom side oil chamber 18C by the closed circuit pumps 31, 41, 51, 61. At this time, when the arm 15 transitions to the latter half of the arm crowding in a state where the pressure in the bottom side oil chamber 18C is excessively reduced as mentioned above, it takes time to increase the pressure in the bottom side oil chamber 18C, and it is impossible to apply the drive force to the arm cylinder 18 during this period. As a result, the cylinder speed (extension speed) of the arm cylinder 18 reduces in the middle of the operation (in the middle of the extension).

Here, when the pressure is reduced, a volume elasticity coefficient of hydraulic oil is reduced. For example, in a case of the hydraulic oil having 1% of an air mixing rate, a volume elasticity coefficient at a pressure of 10 MPa is equal to $1.2 \times 10^3$ MPa that is approximately similar to that of a rigid body. In contrast, a volume elasticity coefficient at a pressure of 0.1 MPa is largely reduced to 8 MPa, which becomes $1/150$ of $1.2 \times 10^3$ MPa that is approximately similar to that of compressible fluid like air. Therefore, even when the hydraulic oil is sent to the bottom side oil chamber 18C in which the pressure is reduced, by the closed circuit pumps 31, 41, 51, 61, the pressure in the bottom side oil chamber 18C is not increased rapidly. As a result, the speed of the arm 15 is reduced at the arm crowding. Thereafter, from the vicinity where the pressure in the bottom side oil chamber 18C exceeds, for example, 1 MPa, the extension speed of the arm cylinder 18 increases, that is, the arm 15 starts to accelerate, and is recovered to a speed Va finally. In this case, since the lever operating amount of the left lever 12A is constant, the speed of the arm 15 is lowered to a speed that an operator does not intend, thus deteriorating the operability. Accordingly, uncomfortable feelings are given to the operator.

Therefore, in the first embodiment, the charge line 72 is provided with the charge pressure adjustment apparatus 75 as the relief valve of a set pressure variable type, and the control device 81 increases a charge pressure (relief pressure) of the charge pressure adjustment apparatus 75) in accordance with the operating amount of the operating device 12 (left lever 12A). This configuration, even at the high-speed operation of the arm crowding, suppresses an excessive reduction in pressure in the bottom side oil chamber 18C in the arm cylinder 18 to suppress a reduction in speed (speed variations) of the arm cylinder 18.

FIG. 9 illustrates a behavior of the arm 15 in the first embodiment. It should be noted that the operating amount of the left lever 12A, the total flow amount Qcp4 of the closed circuit pumps 31, 41, 51, 61, and the total flow amount Qop4 of the open circuit pumps 32, 42, 52, 62 are the same as those of the comparative example in FIG. 11.

In the first embodiment, an operator operates the left lever 12A for extending the arm cylinder 18, and when the operating amount exceeds a preset specified amount (for example, X2 in FIG. 9) at time T2, for example, the control device 81 controls the charge pressure adjustment apparatus 75 to increase the charge pressure (relief pressure) from Pc1 to Pc2. As a result, the pressure in the bottom side oil chamber 18C of the arm cylinder 18 temporarily increases to approximately Pc2. Thereafter, after time T3, the pressure in the bottom side oil chamber 18C of the arm cylinder 18 reduces as similar to a case in FIG. 11, but is not reduced to an atmospheric pressure of approximately zero because of a high original pressure, thus making it possible to suppress an excessive reduction in volume elasticity coefficient.

Therefore, after time T4 as the latter half of the arm crowding, the pressure in the bottom side oil chamber 18C can quickly increase to apply a drive force to the arm cylinder 18. As a result, it is possible to suppress the speed reduction of the arm 15 (arm cylinder 18) to obtain the speed according to the lever operating amount intended by an operator. This allows for an improvement on an operational feeling. When the lever operating amount is lower than the specified amount (for example, X2 in FIG. 9) at time T6, the control device 81 controls the charge pressure adjustment apparatus 75 to reduce the charge pressure (relief pressure) from Pc2 to Pc1.

Therefore, when the cylinder speed is low, that is, when it is not necessary to increase the charge pressure, the consumption power of the charge pump 71 can be suppressed by lowering the charge pressure to reduce the consumption energy. As a result, it is possible to ensure high operability and energy saving performance. Further, when the charge pressure is lowered, the maximum pressure in the hydraulic circuit can be lowered to improve reliability and durability of the machine. It should be noted that the first embodiment has been explained by taking a case where the charge pressure is increased on the condition that the lever operating amount exceeds the specified amount (for example, X2 in FIG. 9), as an example. However, the present invention is not limited thereto, but it may be possible to increase the charge pressure in proportion to the lever operating amount, for example.

In this way, according to the first embodiment, at the time of extending the arm cylinder 18 (at the arm crowding) as the hydraulic cylinder to rotate (lower down) the arm 15 in the air, when the operating amount of the left lever 12A becomes large for the high-speed operation, the control device 81 increases the pressure (bottom pressure) in the bottom side of the arm cylinder 18. Specifically, when the speed (the cylinder speed or extension speed) of the arm cylinder 18 required by an operator becomes fast, leading to the necessity of supply of a large amount of hydraulic oil to the bottom side oil chamber 18C in the arm cylinder 18, the control device 81 makes the set pressure of the charge pressure adjustment apparatus 75 higher than usual (when the operating amount is small). Therefore, the pressure in the bottom side oil chamber 18C in the arm cylinder 18 increases according to the increased set pressure (charge pressure) of the charge pressure adjustment apparatus 75. As a result, also when supply and discharge of a large amount of hydraulic oil at the high-speed operation of the arm cylinder 18 are necessary, it is possible to suppress a reduction in volume elasticity coefficient of hydraulic oil by suppressing an excessive reduction in pressure in the bottom side oil chamber 18C.

Therefore, the speed variations of the arm cylinder 18, that is, a reduction in extension speed of the arm cylinder 18 in the middle of the extension (a reduction in speed of the arm 15 in the middle of the arm crowding) can be suppressed to obtain excellent operability. In addition, at the regular time of the low speed operation of the arm cylinder 18 or the like (when a large flow amount is not necessary or when the pressure loss is small), the set pressure of the charge pressure adjustment apparatus 75 is not increased to be high (that is, the charge pressure is made low). Therefore, the consumption power of the charge pump 71 can be suppressed to reduce the consumption energy. As a result, both of the operability and energy saving performance can be achieved at a high level. In addition, since it is possible to lower the maximum pressure in the hydraulic circuit 20 by lowering the charge pressure, it is possible to improve durability and reliability of the hydraulic excavator 1 as the working machine.

Next, FIG. 10 illustrates a second embodiment of the present invention. The second embodiment is characterized in that upon extending a hydraulic cylinder, a ratio Qo/Qc of a delivery flow amount Qo of an open circuit pump to a delivery flow amount Qc of a closed circuit pump is made large in accordance with an operating amount of an operating device. Therefore, speed variations of the hydraulic cylinder can be suppressed. It should be noted that in the second embodiment, components identical to those in the first embodiment are referred to as identical numerals, and the explanation is omitted.

In the second embodiment, the memory unit of the control device 81, upon extending the hydraulic cylinders 17, 18, 19, stores therein the process program for controlling (increasing a ratio Qoa/Qca of the delivery flow amount) the closed circuit pumps 31, 41, 51, 61 and the open circuit pumps 32, 42, 52, 62 in such a manner as to increase the pressure in the bottom side in the hydraulic cylinders 17, 18, 19 in accordance with an operating amount of the operating device 12. That is, in the second embodiment, in a case where a total flow amount of the open circuit pumps 32, 42, 52, 62 is indicated at Qoa, a total flow amount of the closed circuit pumps 31, 41, 51, 61 is indicated at Qca, and a ratio of the delivery flow amounts Qoa, Qca is indicated at Qoa/Qca, the control device 81 increases the ratio Qoa/Qca in accordance with an operating amount of the left lever 12A upon extending the arm cylinder 18.

FIG. 10 illustrates a behavior of the arm 15 of the second embodiment at the arm crowding. It should be noted that the operating amount of the left lever 12A, the total flow amount (total delivery flow amount) Qcp4 of the closed circuit pumps 31, 41, 51, 61 and the total flow amount (total delivery flow amount) Qop4 of the open circuit pumps 32, 42, 52, 62 are the same as those in a case of the comparative example in FIG. 11 and the first embodiment in FIG. 9.

As illustrated in FIG. 10, an operator operates the left lever 12A for extending the arm cylinder 18, and when the operating amount exceeds a preset specified amount (for example, X2 in FIG. 10) at time T2, for example, the control device 81 controls the closed circuit pumps 31, 41, 51, 61 and the open circuit pumps 32, 42, 52, 62 to increase the ratio Qoa/Qca of the total flow amount Qoa of the open circuit pumps 32, 42, 52, 62 to the total flow amount Qca of the closed circuit pumps 31, 41, 51, 61.

Here, in the aforementioned comparative example and first embodiment, the total flow amount Qcp4 of the closed circuit pumps 31, 41, 51, 61 and the total flow amount Qop4 of the open circuit pumps 32, 42, 52, 62 are specified as follows. That is, when an area of the bottom side oil chamber 18C in the arm cylinder 18 is indicated at "Aa3", an area of the rod side oil chamber 18D in the arm cylinder 18 is indicated at "Aa4, and the area ratio is indicated at "Aa3: Aa4", for supplementing a difference between a discharge amount of the rod side oil chamber 18D and a supply amount of the bottom side oil chamber 18C, Qcp4 and Qop4 are determined to satisfy a relation of "Aa3:Aa4=(Qcp4+Qop4): Qcp4". Further, when the total flow amount Qcp4 of the closed circuit pumps 31, 41, 51, 61 is indicated at "1", the total flow amount Qop4 of the open circuit pumps 32, 42, 52, 62 is found according to "Qop4=Aa3/Aa4−1", and a ratio Qop4/Qcp4 is also found according to "Qop4/Qcp4=Qop4/ 1=Qop4=Aa3/Aa4−1".

In contrast, in the second embodiment, when the lever operating amount is X4 at time T3, the total flow amount Qca of the closed circuit pumps 31, 41, 51, 61 is reduced to Qcpd smaller than Qcp4 and the total flow amount Qoa of the open circuit pumps 32, 42, 52, 62 is increased to Qopu larger than Qop4 to make a ratio Qoa/Qca larger than "Aa3/Aa4−1". As a result, the flow amount of the hydraulic oil flowing into the bottom side oil chamber 18C in the arm cylinder 18 is inclined to be excessive. Therefore, even when the leak flow amount from the closed circuit pumps 31, 41, 51, 61 increases at the high-speed driving, the supplement of the hydraulic oil from the charge line 72 becomes unnecessary or it is possible to reduce the supplement amount of the hydraulic oil to be small. As a result, an excessive reduction in pressure of the bottom side oil chamber 18C can be suppressed. Therefore, the speed reduction (speed variations) of the arm cylinder 18 can be suppressed to obtain the speed intended by an operator and improve the operability.

The second embodiment is configured such that, as described above, the ratio Qoa/Qca of the total flow amount Qca of the closed circuit pumps 31, 41, 51, 61 and the total flow amount Qoa of the open circuit pumps 32, 42, 52, 62 is made large in accordance with the operating amount of the left lever 12A. Accordingly, the basic function does not differ particularly from that of the aforementioned first embodiment.

Particularly, according to the second embodiment, upon extending the arm cylinder 18, the control device 81 can increase the pressure of the bottom side oil chamber 18C in the arm cylinder 18 as the hydraulic cylinder corresponding to the amount of increasing the ratio Qoa/Qca of the total flow amount Qca of the closed circuit pumps 31, 41, 51, 61 and the total flow amount Qoa of the open circuit pumps 32, 42, 52, 62. That is, at the high-speed operation of the arm cylinder 18, the ratio Qoa/Qca is made larger than "Aa3/Aa4−1". As a result, the flow amount of the hydraulic oil flowing into the bottom side oil chamber 18C can be inclined to be excessive to increase the pressure in the bottom side oil chamber 18C. Therefore, at the high-speed operation of the arm cylinder 18, an excessive reduction in pressure of the bottom side oil chamber 18C can be suppressed, and the speed variations of the arm cylinder 18 can be suppressed. As a result, the high operability can be obtained.

It should be noted that the second embodiment is explained by taking a case of changing the ratio Qoa/Qca of the total flow amount Qca of the closed circuit pumps 31, 41, 51, 61 and the total flow amount Qoa of the open circuit pumps 32, 42, 52, 62 on the condition that the lever operating amount exceeds the specified amount (for example, X2 in FIG. 10), as an example. However, the present invention is not limited thereto, but the ratio Qoa/Qca may be changed in proportion to the lever operating amount, for example.

The second embodiment is explained by taking a case of changing the ratio Qoa/Qca of the total flow amount Qca of the closed circuit pumps 31, 41, 51, 61 and the total flow amount Qoa of the open circuit pumps 32, 42, 52, 62, as an example. In this case, the second embodiment does not adopt the configuration as in the first embodiment of increasing the set pressure of the charge pressure adjustment apparatus 75 to be high in accordance with the operating amount of the left lever 12A. Therefore, in the second embodiment, the charge pressure adjustment apparatus 75 as in the first embodiment may not be provided. That is, in the second embodiment, a relief valve of a set pressure fixing type may be provided in place of the charge pressure adjustment apparatus 75.

On the other hand, in a case where the charge pressure adjustment apparatus 75 is provided in the charge line 72, for example, the control according to the first embodiment may be combined with the control according to the second embodiment. That is, the control device 81, in response to an operation of the operating device 12, may increase the charge pressure (relief pressure) of the charge pressure adjustment apparatus 75 as in the first embodiment, and may increase the ratio Qoa/Qca of the total flow amount Qca of the closed circuit pumps 31, 41, 51, 61 and the total flow amount Qoa of the open circuit pumps 32, 42, 52, 62 as in the second embodiment.

The second embodiment is explained by taking a case of changing both of the total flow amount Qca of the closed circuit pumps 31, 41, 51, 61 and the total flow amount Qoa of the open circuit pumps 32, 42, 52, 62, as an example. However, the present invention is not limited thereto, but, for example, the ratio Qoa/Qca may be changed by changing one of the total flow amount (total delivery flow amount) Qca of the closed circuit pumps 31, 41, 51, 61 and the total flow amount (total delivery flow amount) Qoa of the open circuit pumps 32, 42, 52, 62.

For example, in the configuration of increasing the ratio Qoa/Qca by increasing the total flow amount Qoa of the open circuit pumps 32, 42, 52, 62, it is possible to increase the pressure of the bottom side oil chamber 18C in the arm cylinder 18 as the hydraulic cylinder corresponding to the amount of increasing the total flow amount Qoa of the open circuit pumps 32, 42, 52, 62. As a result, at the high-speed operation of the arm cylinder 18, an excessive reduction in pressure of the bottom side oil chamber 18C can be suppressed, and the speed variations of the arm cylinder 18 can be suppressed. In addition, at the regular time of the low-speed operation of the arm cylinder 18 or the like (when a large flow amount is not necessary or a pressure loss is small), no increase (reduction) in the total flow amount Qoa of the open circuit pumps 32, 42, 52, 62 can suppress the consumption power of the open circuit pumps 32, 42, 52, 62 to reduce the consumption energy. As a result, both of the operability and energy saving performance can be accomplished at a high level.

On the other hand, in the configuration where the ratio Qoa/Qca is made large by reducing the total flow amount Qca of the closed circuit pumps 31, 41, 51, 61, it is possible to increase the pressure of the bottom side oil chamber 18C in the arm cylinder 18 as the hydraulic cylinder corresponding to the amount of reducing the total flow amount Qca of the closed circuit pumps 31, 41, 51, 61. As a result, at the high-speed operation of the arm cylinder 18, an excessive reduction in pressure of the bottom side oil chamber 18C can be suppressed, and the speed variations of the arm cylinder 18 can be suppressed. At this time, since the total flow amount Qca of the closed circuit pumps 31, 41, 51, 61 is reduced, the consumption power of the closed circuit pumps 31, 41, 51, 61 can be suppressed to reduce the consumption energy. As a result, both of the operability and energy saving performance can be accomplished at a high level.

The first embodiment and the second embodiment are explained by taking the operation of the arm cylinder 18 as an example. However, the present invention is not limited thereto, but may be applied to a hydraulic cylinder other than the arm cylinder 18, for example, the bucket cylinder 19 a load direction of which is reversed in the posture in the air or the like.

The first embodiment and the second embodiment are explained by taking the hydraulic circuit 20 that operates a total of six hydraulic actuators composing three hydraulic cylinders (the boom cylinder 17, arm cylinder 18, and bucket cylinder 19) and three hydraulic motors (the revolving hydraulic motor 6 and the left and right traveling hydraulic motors 3, 4), as an example. More specifically, the configuration provided with the three hydraulic cylinders 17, 18, 19, the four closed circuit pumps 31, 41, 51, 61 and the four open circuit pumps 32, 42, 52, 62 is explained as an example.

However, the present invention is not limited thereto, but the present invention may be applied to the configuration of operating one hydraulic cylinder with one closed circuit pump and one open circuit pump. That is, the numbers of hydraulic cylinders, closed circuit pumps and open circuit pumps are not limited. For example, the hydraulic pump may include a plurality of hydraulic pumps each having a small capacity or may include one hydraulic pump having a large capacity. Even in such a configuration, it is possible to suppress variations of the extension speed upon extending the hydraulic cylinder at high speeds.

The first embodiment and the second embodiment each are explained by taking the configuration where the hydraulic pumps 31, 32, 41, 42, 51, 52, 61, 62, 71 are driven by the engine 21 as the prime mover, as an example. However, the present invention is not limited thereto, but the hydraulic pump may be driven by an electric motor (electric machinery), for example. In addition, the hydraulic pump may be driven by a combination of an electric motor and an engine.

The first embodiment and the second embodiment each are explained by taking the hydraulic excavator 1 as the working machine as an example. However, the present invention is not limited thereto, but the present invention may be applied widely to various industrial machines including construction machines such as hydraulic cranes, wheel loaders, fork lifts, and the like, in other words, various working machines for performing the work by the hydraulic cylinder.

DESCRIPTION OF REFERENCE NUMERALS

1: Hydraulic excavator (Working machine)
12: Operating device
17: Boom cylinder (Hydraulic cylinder)
18: Arm cylinder (Hydraulic cylinder)
19: Bucket cylinder (Hydraulic cylinder)
17B, 18B, 19B: Piston
17C, 18C, 19C: Bottom side oil chamber
17D, 18D, 19D: Rod side oil chamber
17E, 18E, 19E: Rod
31, 41, 51, 61: Closed circuit pump
32, 42, 52, 62: Open circuit pump
33, 43, 53, 63: Cylinder side closed circuit line (Closed circuit line)
36, 46, 56, 66: Cylinder side open circuit line (Open circuit line)
71: Charge pump
72: Charge line
73: Pump side check valve (Check valve)
74: Cylinder side check valve (Check valve)
75: Charge pressure adjustment apparatus
81: Control device

The invention claimed is:

1. A working machine comprising:

at least one hydraulic cylinder in which a bottom side oil chamber and a rod side oil chamber are defined by a piston to which one end of a rod is fixed, and that extends or retracts based upon supply/discharge of hydraulic oil;

at least one closed circuit pump that is connected to the bottom side oil chamber and the rod side oil chamber in the hydraulic cylinder via a closed circuit line configuring a closed circuit;

at least one open circuit pump that is connected to the bottom side oil chamber in the hydraulic cylinder via an open circuit line configuring an open circuit;

a charge pump that is connected to the closed circuit line via a charge line and a check valve to supplement the hydraulic oil to the closed circuit line;

an operating device for operating the hydraulic cylinder; and a control device that controls the closed circuit pump and the open circuit pump in accordance with an operating amount of the operating device; wherein in case of increasing the operating amount of the operating device extending the hydraulic cylinder, the control device controls of the closed circuit pump and the open circuit pump in such a manner as to make a ratio of a supply amount of the hydraulic oil to the bottom side oil chamber in the hydraulic cylinder to a discharge amount of the hydraulic oil from the rod side oil chamber in the hydraulic cylinder larger than a ratio of a pressure-receiving area of the bottom side oil chamber in the hydraulic cylinder to a pressure-receiving area of the rod side oil chamber in the hydraulic cylinder.

2. The working machine according to claim 1, wherein the charge line is provided with a charge pressure adjustment apparatus that is controlled by the control device and variably adjusts the pressure in the charge line, and the control device increases a set pressure of the charge pressure adjustment apparatus in accordance with increasing the operating amount of the operating device.

* * * * *